US010732830B2

United States Patent
Kato et al.

(10) Patent No.: US 10,732,830 B2
(45) Date of Patent: *Aug. 4, 2020

(54) DISPLAY APPARATUS FOR DISPLAYING IMAGES

(71) Applicant: CASIO COMPUTER CO., LTD., Shibuya-ku, Tokyo (JP)

(72) Inventors: Hiroyuki Kato, Fussa (JP); Hideaki Matsuda, Tokyo (JP); Jun Muraki, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,317

(22) Filed: Nov. 9, 2018

(65) Prior Publication Data

US 2019/0079667 A1 Mar. 14, 2019

Related U.S. Application Data

(62) Division of application No. 15/064,506, filed on Mar. 8, 2016, now Pat. No. 10,162,516.

(51) Int. Cl.
*G06F 3/0482* (2013.01)
*G06F 3/041* (2006.01)
*G06F 3/0488* (2013.01)

(52) U.S. Cl.
CPC ................. *G06F 3/04883* (2013.01)

(58) Field of Classification Search
CPC ................. G06F 3/04845; G06F 3/04883
See application file for complete search history.

(56) References Cited

U.S. PATENT DOCUMENTS

| 7,355,620 | B2 | 4/2008 | Ikehata et al. |
| 2004/0046887 | A1* | 3/2004 | Ikehata ............... G06F 3/04883 348/333.12 |
| 2007/0152984 | A1* | 7/2007 | Ording ............... G06F 3/04845 345/173 |
| 2010/0123734 | A1 | 5/2010 | Ozawa et al. |

(Continued)

FOREIGN PATENT DOCUMENTS

| JP | 07013685 A | 1/1995 |
| JP | 2004104594 A | 4/2004 |

(Continued)

OTHER PUBLICATIONS

Japanese Office Action (and English translation thereof) dated Aug. 30, 2016, issued in counterpart Japanese Application No. 2015-156913.

(Continued)

*Primary Examiner* — Rayeez R Chowdhury
(74) *Attorney, Agent, or Firm* — Holtz, Holtz & Volek PC

(57) ABSTRACT

A display apparatus includes a touch panel that is configured to be touched by a user, a display unit, and a processor that is configured to measure a sliding amount of a user's slide operation while the slide operation is performed, the slide operation being started from a position on the touch panel, and continuously control a switching amount of switching an image displayed on the display unit to another image while the slide operation is performed, the switching amount of switching being variable according to the measured sliding amount.

9 Claims, 19 Drawing Sheets

(56) References Cited

U.S. PATENT DOCUMENTS

| | | | |
|---|---|---|---|
| 2010/0164895 A1* | 7/2010 | Kim | G06F 3/0485 345/173 |
| 2012/0079386 A1 | 3/2012 | Kim et al. | |
| 2012/0105346 A1* | 5/2012 | Chen | G06F 3/04883 345/173 |
| 2012/0182325 A1* | 7/2012 | Hayashi | G06F 3/0485 345/684 |
| 2012/0314967 A1 | 12/2012 | Suzuki et al. | |
| 2013/0307792 A1* | 11/2013 | Andres | G11B 27/005 345/173 |
| 2016/0018983 A1* | 1/2016 | Bostick | G06F 3/0485 715/720 |
| 2016/0267945 A1* | 9/2016 | Daishaku | G06F 3/0488 |

FOREIGN PATENT DOCUMENTS

| | | | |
|---|---|---|---|
| JP | 2005323089 A | 11/2005 | |
| JP | 2006157345 A | 6/2006 | |
| JP | 2009043225 A | 2/2009 | |
| JP | 2010122856 A | 6/2010 | |
| JP | 2010176575 A | 8/2010 | |
| JP | 2013005041 A | 1/2013 | |
| JP | 2013175214 A | 9/2013 | |
| JP | 2014137817 A | 7/2014 | |
| JP | 2015069383 A | 4/2015 | |

OTHER PUBLICATIONS

Japanese Office Action (and English translation thereof) dated Oct. 25, 2016 issued in Japanese counterpart Application No. 2015-156913.

Japanese Office Action dated Apr. 16, 2019 (and English translation thereof) issued in Japanese Application No. 2017-030622.

Japanese Office Action dated Jan. 22, 2019 (and English translation thereof) issued in Japanese Application No. 2017-030622.

Chinese Office Action (and English language translation thereof) dated Mar. 18, 2020 issued in Chinese Application No. 20181194233.4.

* cited by examiner

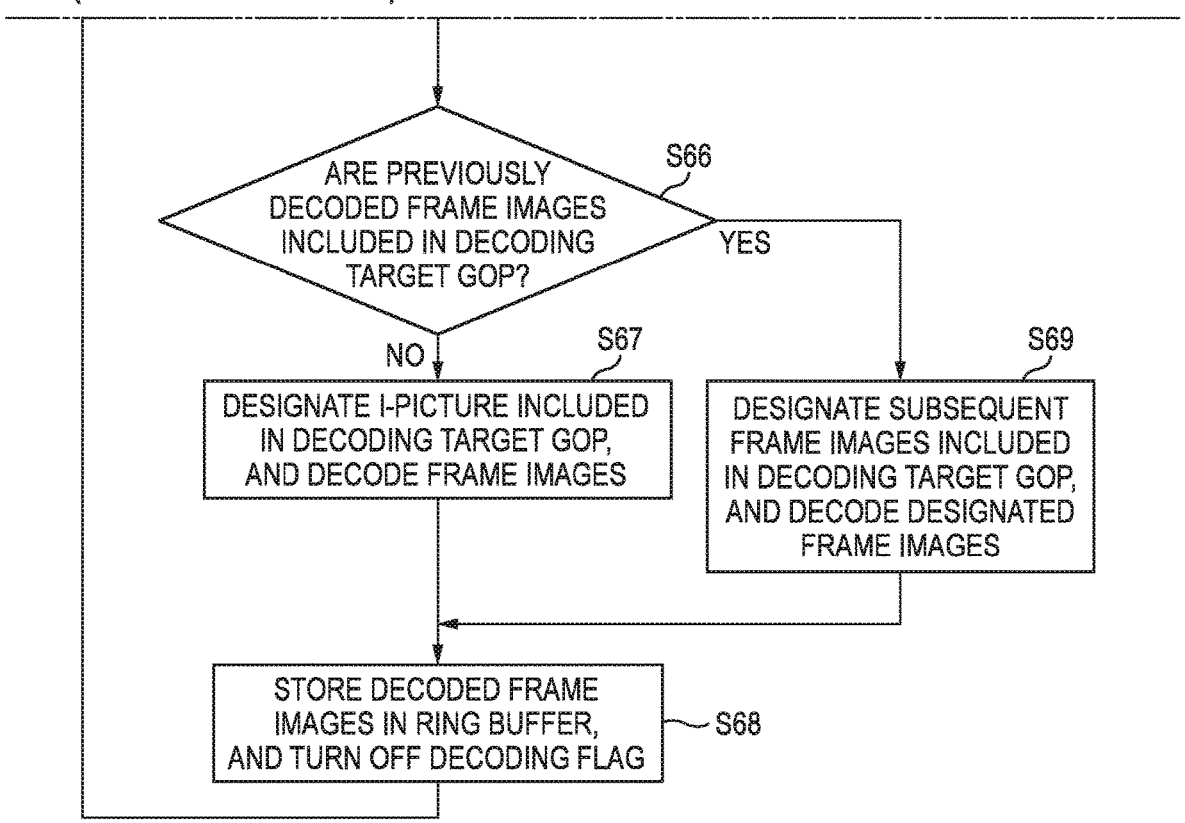

DISPLAY APPARATUS FOR DISPLAYING IMAGES

CROSS-REFERENCE TO RELAYED APPLICATION

This application is a Divisional application of U.S. application Ser. No. 15/064,506, filed Mar. 8, 2016, which is based upon and claims the benefit of priority from prior Japanese Patent Application Nos. 2015-104390, filed May 22, 2015, and 2015-156913, filed Aug. 7, 2015. The entire contents of all the above-identified applications are incorporated herein by reference.

BACKGROUND OF THE INVENTION

1. Field of the Invention

The present invention relates to a display apparatus and a display method.

2. Description of the Related Art

In the related art, there is known a display apparatus having an operation unit enabling a user to perform speed adjustment such as fast forwarding, rewinding, and slow motion reproduction in reproducing videos. The operation unit includes keys or dials of hardware. However, the operation unit is provided separately from a video display unit, and thus hinders the display apparatus from being downsized.

For this reason, there are disclosed a technology for controlling the speed of video reproduction according to the direction and speed of a slide operation on a touch panel as disclosed in JP-A-2004-104594, and a technology for semi-transparently displaying a plurality of reproduction speeds on the display of a video such that a user can recognize the relation between positions on a touch panel and the reproduction speeds as disclosed in JP-A-2010-176575.

SUMMARY OF THE INVENTION

According to an aspect of the invention, a display apparatus includes a touch panel, a display unit and a processor. The touch panel is configured to be touched by a user. The display unit is configured to reproduce a video which is imaged at an imaging frame rate. The processor is configured to: acquire an imaging frame rate of a video to be reproduced; subsequently measure an operation speed of a user's touch operation on the touch panel while the touch operation is performed; and control reproduction of the video displayed on the display unit, based on the acquired imaging frame rate and the measured operation speed.

According to another aspect of the invention, a display apparatus includes a touch panel, a display unit and a processor. The touch panel is configured to be touched by a user. The processor is configured to: measure a sliding amount of a user's slide operation subsequently while the slide operation is performed, the slide operation being started from a position on the touch panel; and continuously control a switching amount of switching an image displayed on the display unit to another image while the slide operation is performed, the switching amount of switching being variable according to the measured sliding amount.

According to another aspect of the invention, a display apparatus includes a touch panel, a display unit and a processor. The touch panel is configured to be touched by a user. The processor is configured to: subsequently measure an acceleration of a user's slide operation on the touch panel; and continuously control a switching speed of switching an image displayed on the display unit to another image while the slide operation is performed, the switching speed being variable according to the measured acceleration of the slide operation.

According to another aspect of the invention, a display apparatus includes a touch panel, a display unit and a processor. The touch panel is configured to be touched by a user. The display unit is configured to reproduce a video. The processor is configured to: control a reproduction speed of a video to be displayed on the display unit, based on a sliding amount of a user's slide operation on the touch panel; and control reproduction of the video to be displayed on the display unit at the controlled reproduction speed at a time when the slide operation on the touch panel is completed, after the slide operation on the touch panel is completed.

According to another aspect of the invention, a display method is a method of a display apparatus which includes a touch panel that is configured to be touched by a user and a display unit that is configured to reproduce a video which is imaged at an imaging frame rate. The method includes: acquiring an imaging frame rate of a video to be reproduced; subsequently measuring an operation speed of a user's touch operation on the touch panel while the touch operation is performed; and controlling reproduction of the video displayed on the display unit, based on the acquired imaging frame rate and the measured operation speed.

BRIEF DESCRIPTION OF THE DRAWINGS

If the following description is considered in conjunction with the following drawings, it is possible to more deeply understand this application.

DETAILED DESCRIPTION OF THE PREFERRED EMBODIMENTS

Figure 1:
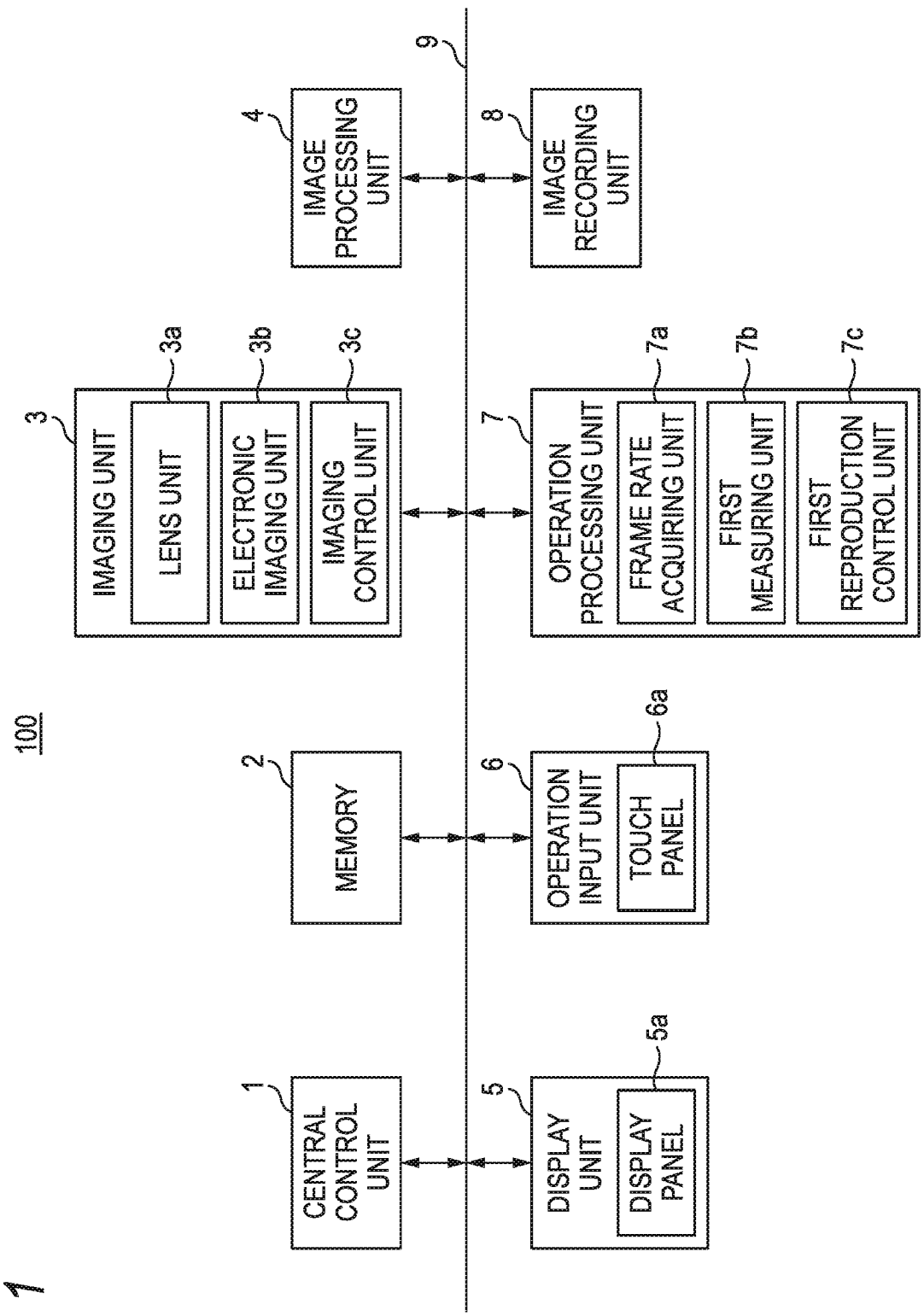
FIG. 1 is a block diagram illustrating a rough configuration of an imaging apparatus of a first embodiment according to the present invention.

Hereinafter, with respect to the present invention, specific embodiments will be described with reference to the accompanying drawings. However, the scope of the invention is not limited to examples shown in the drawings.

First Embodiment

FIG. 1 is a block diagram illustrating a rough configuration of an imaging apparatus 100 of a first embodiment according to the present invention.

As shown in FIG. 1, the imaging apparatus 100 of the first embodiment specifically includes a central control unit 1, a memory 2, an imaging unit 3, an image processing unit 4, a display unit 5, an operation input unit 6, an operation processing unit 7, and an image recording unit 8.

Also, the central control unit 1, the memory 2, the imaging unit 3, the image processing unit 4, the display unit 5, the operation input unit 6, the operation processing unit 7, and the image recording unit 8 are connected to one another through a bus line 9.

The central control unit 1 is for controlling the individual units of the imaging apparatus 100. Specifically, the central control unit 1 includes a central processing unit (CPU) and the like (not shown), and performs various control operations according to various programs (not shown) for the imaging apparatus 100.

The memory 2 may be configured by a dynamic random access memory (DRAM) or the like, and temporarily stores data and the like to be processed by the central control unit 1, the operation processing unit 7, and so on.

The imaging unit 3 images photogenic subjects at a certain imaging frame rate, thereby generating frame images. Specifically, the imaging unit 3 includes a lens unit 3a, an electric imaging unit 3b, and an imaging control unit 3c.

The lens unit 3a is composed of a plurality of lenses such as a zoom lens and a focusing lens.

The electric imaging unit 3b is composed of an image sensor (an imaging element) such as a charge coupled device (CCD) or a complementary metal-oxide semiconductor (CMOS). In this configuration, the electric imaging unit 3b receives optical images through the various lenses of the lens unit 3a, and converts the optical images into 2D-image signals.

The imaging control unit 3c controls imaging of the imaging unit 3 on photogenic subjects.

Although not shown, the imaging control unit 3c includes a timing generator, a driver, and so on. In this configuration, the imaging control unit 3c drives the electric imaging unit 3b by the timing generator and the driver such that the electric imaging unit performs scanning, and controls the electric imaging unit 3b such that the electric imaging unit converts optical images received through the lens unit 3a, into 2D-image signals, at predetermined intervals, and reads frame images from the imaging area of the electric imaging unit 3b, one scene by one scene, and outputs the read frame images to the image processing unit 4.

Further, the imaging control unit 3c performs condition control for imaging photogenic subjects, such as AF (automatic focusing), AE (automatic exposure), and AWB (automatic white balance).

Also, the imaging unit 3 may include a diaphragm for adjusting the amount of light traversing the lens unit 3a, a zoom drive unit for moving the zoom lens in an optical axis direction, a focusing unit for moving the focusing lens in the optical axis direction, and so on (all of which are not shown), in addition to the lens unit 3a, the electric imaging unit 3b, and the imaging control unit 3c.

The image processing unit 4 performs a variety of image signal processing on analog frame image signals transmitted from the electric imaging unit 3b. Specifically, the image processing unit 4 appropriately performs gain adjustment on an analog frame image signal transmitted from the electric imaging unit 3b, with respect to each of R, G, and B color components, and samples and holds the analog frame image signal by a sample-and-hold circuit (not shown), and converts the analog frame image signal into digital data by an A/D converter (not shown), and performs a pixel interpolation process and a gamma correction process on the digital data by a color-process circuit (not shown), and generates a digital luminance signal Y and digital color-difference signals Cb and Cr (YUV data).

The luminance signal Y and the color-difference signals Cb and Cr which are output from the color-process circuit are transmitted to the memory 2 which is used as a buffer memory, thorough a DMA controller (not shown), by DMA transfer.

The display unit 5 displays images on the display screen of a display panel 5a.

In other words, the display unit 5 displays designated images on the display screen of the display panel 5a based on image data having a predetermined size and decoded by the image processing unit 4. Also, the display unit 5 reproduces videos made at certain imaging frame rates, at a predetermined reproduction frame rate (for example, 30 fps), under control of a first reproduction control unit 7c of the operation processing unit 7, as will be described below.

Also, the display panel 5a is composed of, for example, a liquid crystal display panel or an organic EL (electroluminescence) display panel. However, this is an example, and does not limit the present invention.

The operation input unit 6 is for performing predetermined operations on the imaging apparatus 100. Specifically, the operation input unit 6 includes a shutter button related to an instruction for acquiring a still image of a photogenic subject, an instruction for starting to make a video, and an instruction for completing making of a video, a selection determination button related to selection instructions of an imaging mode, a reproduction mode, functions, and so on, and a zoom button related to an instruction for adjusting the amount of zoom, and so on (all of which are not shown).

If various buttons are operated by a user, the operation input unit 6 outputs operation instructions according to the operated buttons, to the central control unit 1. The central control unit 1 performs control according to the operation instructions input from the operation input unit 6 such that the individual units perform predetermined operations (for example, video reproduction).

Also, the operation input unit 6 includes a touch panel 6a provided integrally with the display panel 5a of the display unit 5.

The touch panel 6a detects the positions of direct or indirect touches of user's fingers (hands), touch pens, and the like on the display screen of the display panel 5a forming a display area. In other words, the touch panel 6a may be provided on the display screen of the display panel 5a or may be provided on the inner side from the display screen, and detects the X and Y coordinates of the positions of touches on the display screen by various systems such as an electrostatic capacity system, a resistive film system, and an ultrasonic surface acoustic wave system.

Then, the touch panel 6a outputs position signals related to the X and Y coordinates of the positions of the touches, to the operation processing unit 7.

The operation processing unit 7 includes a frame rate acquiring unit 7a, a first measuring unit 7b, and the first reproduction control unit 7c.

Also, each unit of the operation processing unit 7 is composed of, for example, a predetermined block circuit; however, this configuration is an example, and does not limit the present invention.

The frame rate acquiring unit (an acquiring unit) 7a acquires the imaging frame rate of a video to be reproduced.

In other words, if a user designates a video as a reproduction object by performing a predetermined operation on the operation input unit 6, the frame rate acquiring unit 7a reads out the video from the image recording unit 8, and acquires the imaging frame rate of the video.

Also, the frame rate acquiring unit 7a may acquire the imaging frame rate of a video which is a reproduction object, before the video is reproduced or when the video is reproduced.

The first measuring unit (a measuring unit) 7b sequentially measures the speed of a user's touch operation on the touch panel 6a while the touch operation is being performed.

In other words, while the user user's touch operation on the touch panel 6a is performed, the first measuring unit 7b sequentially measures the amount of slide (the number of pixels) per unit time, as the operation speed.

Specifically, for example, when a video is displayed on the display panel 5a, if the touch panel 6a is touched by the user, the first measuring unit 7b acquires a position signal related to X and Y coordinates having the position of the touch as their origin and output from the touch panel 6a, and acquires the reproduction time Ttouch (see FIG. 3) when the touch panel 6a was touched by the user, from a clocking unit (not shown). Thereafter, if the user starts a slide operation on the touch panel 6a, the first measuring unit 7b acquires position signals related to the X and Y coordinates of touch positions Xposition and sequentially output from the touch panel 6a while acquiring a period when the touch panel 6a has been touched, from the clocking unit, and calculates the amount of slide per unit time (for example, the number of touched pixels per second) as the operation speed V (px/s).

Also, if the user completes the slide operation on the touch panel 6a (after release of the touch), the first measuring unit 7b acquires the touch position of the touch panel 6a finally touched by the user.

In this case, the first measuring unit measures the speed of a slide operation in the X axis direction. However, the first measuring unit may be configured to measure the speed of a slide operation in the Y axis direction. In this case, touch positions are denoted by Yposition.

The above described configuration enables the user to start a slide operation at an arbitrary position on the touch panel 6a, and if the user starts a slide operation at an arbitrary position on the touch panel 6a, the first measuring unit 7b sequentially measures the speed of the operation while the operation is being performed.

The first reproduction control unit 7c controls reproduction of a video which is displayed on the display unit 5.

For example, the first reproduction control unit 7c includes a video random access memory (VRAM), a VRAM controller, a digital video encoder, and so on (all of which are not shown). In this configuration, the digital video encoder reads out a luminance signal Y and color-difference signals Cb and Cr decoded by the image processing unit 4 and recorded in the VRAM, from the VRAM through the VRAM controller, at a predetermined reproduction frame rate (for example, 30 fps), and generates a video signal based on data on those signals, and outputs the video signal to the display panel 5a of the display unit 5.

Also, the first reproduction control unit (a control unit) 7c controls reproduction of a video which is displayed on the display unit 5, based on an imaging frame rate acquired by the frame rate acquiring unit 7a and the speed of an operation sequentially measured by the first measuring unit 7b. In other words, while the user performs a slide operation on the touch panel 6a, the first reproduction control unit 7c performs fast-slow reproduction of the video for a constant time in a predetermined direction (such as the forward direction or the backward direction) according to the amount of slide. That is, the first reproduction control unit 7 controls to maintain the constant time to perform fast-slow reproduction of the video regardless of the imaging frame rate of the video. Specifically, the first reproduction control unit 7c changes at least one of the reproduction frame rate and the decimation rate according to the acquired imaging frame rate to perform fast-slow reproduction of the video for the constant time according to the amount of slide of a user's slide operation on the touch panel 6a.

Here, the term "fast-slow reproduction" means forward or backward reproduction at a speed higher than or lower than a normal reproduction speed, such as fast forwarding, fast rewinding, slow forwarding, and slow rewinding.

Figure 3:
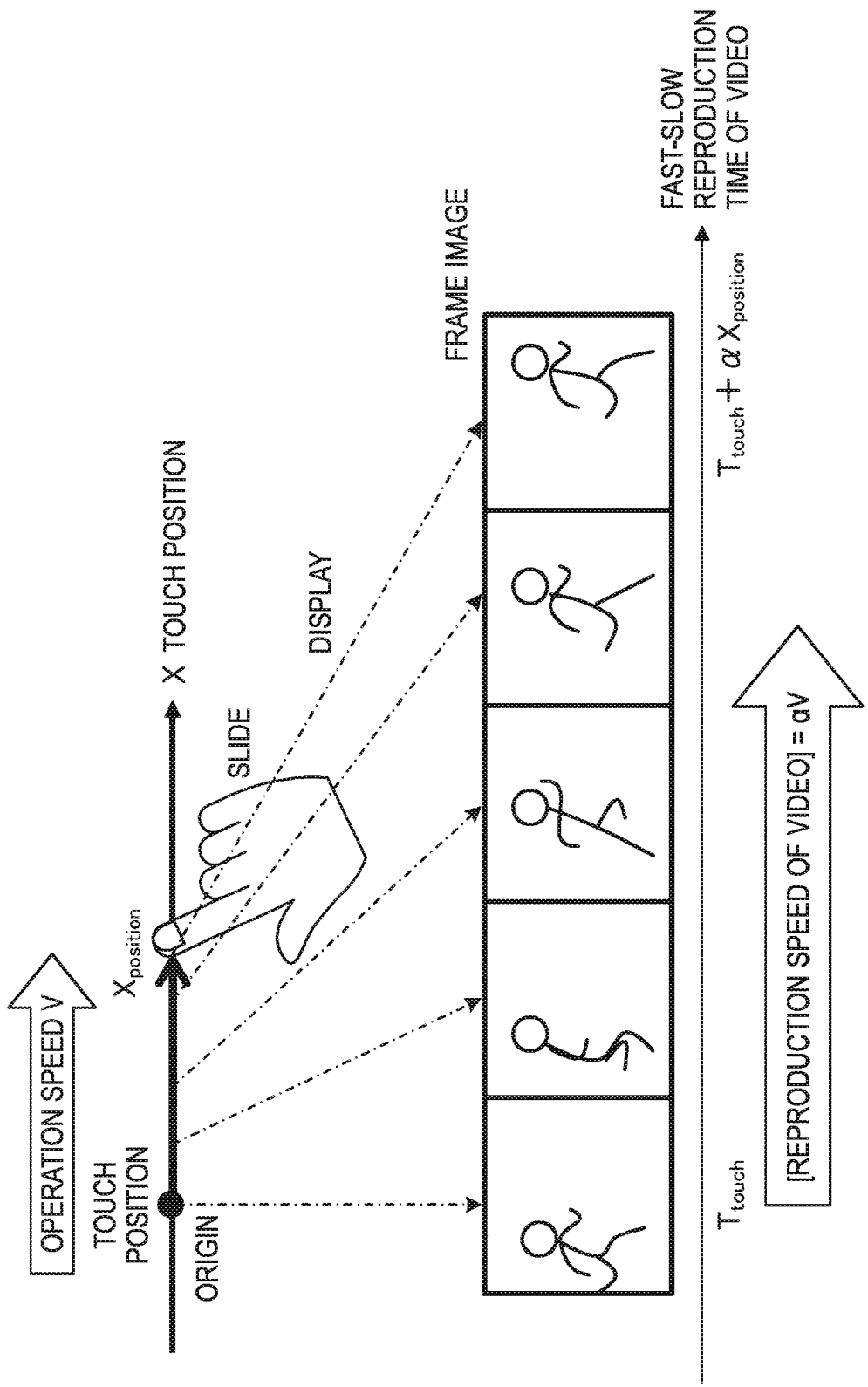
FIG. 3 is a view for explaining fast-slow video reproduction in the reproducing process of FIG. 2.

For example, if it is assumed that the ratio of the time to perform fast-slow reproduction with respect to the amount of slide which is performed on the touch panel 6a by the user is α (for example, the initial value of α is 10), the first reproduction control unit 7c subsequently calculates the time to perform fast-slow reproduction (fast-slow reproduction time), based on values (α·Xposition) which is obtained by multiplying the touch positions Xposition of the touch panel 6a touched by the user by a, and the reproduction time Ttouch when the touch panel 6a was touched by the user (see FIG. 3). Also, the first reproduction control unit 7c multiplies the amount of slide per unit time subsequently measured by the first measuring unit 7b by α, thereby calculating the reproduction speed α·V for performing fast-slow reproduction of the video (see FIG. 3).

Also, if the user's slide operation on the touch panel 6a completes (if the touch is released), the first reproduction control unit 7c controls reproduction of the video such that the video is reproduced at the reproduction frame rate according to the operation speed calculated when the slide operation is completed. For example, the first reproduction control unit 7c multiplies the ratio α by the operation speed V (px/s) measured by the first measuring unit 7b when the touch panel 6a was finally touched by the user, thereby calculating the reproduction speed α·V of the video, as the speed after the completion of the slide operation (after release of the touch) (see FIG. 4).

Figure 4:
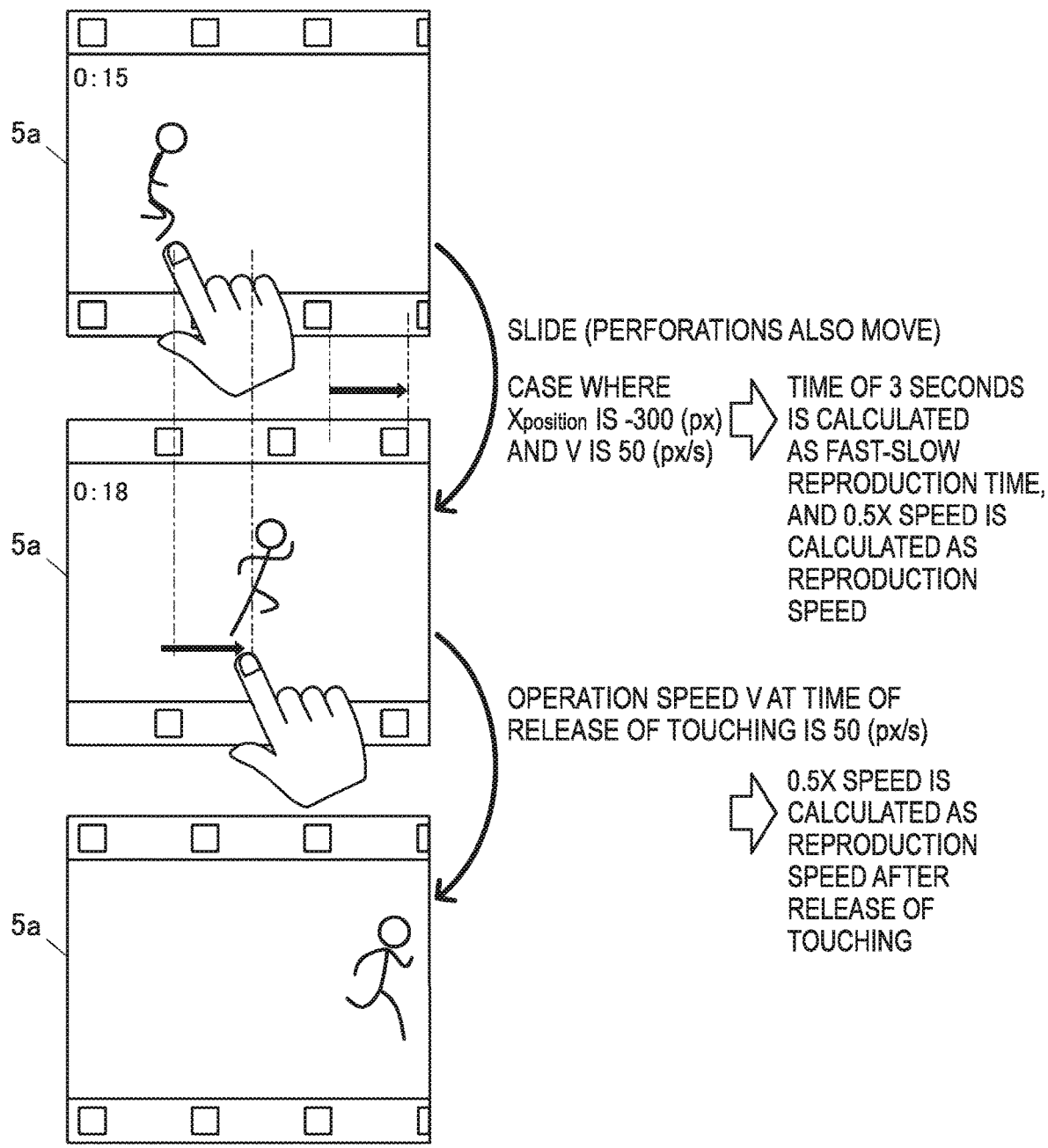
FIG. 4 is a view schematically illustrating an example of a video display mode in the reproducing process of FIG. 2.

Specifically, for example, as shown in FIG. 4, a certain direction (for example, the right direction) in which a user can perform a slide operation and the forward direction in which a video can be reproduced fast or slowly are associated with each other in advance. In this case, if the user slides a finger on the touch panel 6a in the certain direction (for example, the right direction) at a constant operation speed V (=50 (px/s) by 300 px and releases the finger the touch panel, the first reproduction control unit 7c calculates the time to perform forward fast-slow reproduction regardless of the imaging frame rate of the reproduction object video, thereby obtaining 3 (300 (px)×10 (ms/px)) seconds, and calculates the forward reproduction speed of the video as (10 (ms/px)×50 (px/s)/1000 (ms)), thereby obtaining ½× speed.

In other words, for example, in a case where the imaging frame rate of the reproduction object video is 30 fps, the first reproduction control unit 7c sets the reproduction frame rate and decimation rate of fast-slow reproduction while the user is performing the slide operation on the touch panel 6a, such that a frame image prior to a frame image displayed when the touch panel 6a was finally touched by the user by 90 frames is displayed after 3 seconds from the time Ttouch when the touch panel 6a was finally touched by the user. Similarly, in a case where the imaging frame rate of the reproduction object video is 240 fps, the first reproduction control unit 7c sets the reproduction frame rate and decimation rate of fast-slow reproduction while the user is performing the slide operation on the touch panel 6a, such that a frame image prior to a frame image displayed when the touch panel 6a was finally touched by the user by 720 frames is displayed after 3 seconds from the time Ttouch when the touch panel 6a was finally touched by the user.

The setting of the reproduction frame rate and the decimation rate is a known technology, and thus a detailed description thereof will not be made.

Also, in a case where the user performs a slide operation on the touch panel 6a in the opposite direction (for example, the left direction) to the certain direction, the first reproduction control unit 7c calculates the time to perform fast-slow reproduction in the opposite direction, the reproduction speed of the video in the opposite direction, and so on, regardless of the imaging frame rate of the reproduction object video.

Also, in a case where the operation speed when the user completes a slide operation on the touch panel 6a is 0, that is, in a case where the user temporarily stops a slide operation on the touch panel 6a and releases a finger the touch panel, the first reproduction control unit 7c may temporarily stop reproduction of a video while keeping a frame image of the video displayed on the display panel 5a when the slide operation is completed.

Also, in a case of performing fast-slow reproduction in the above described manner, the first reproduction control unit 7c may additionally display perforations at a predetermined position (for example, on the upper and lower sides) with respect to frame images on the display unit 5, in imitation of perforations formed at regular intervals at the edge of a movie film like a silver film, while changing the movement speed of the perforations according to the reproduction speed of a video (see FIG. 4).

The image recording unit 8 is composed of, for example, a non-volatile memory (a flash memory), and records, as records of still images and videos, image data encoded in a predetermined compression format (such as the JPEG format or the MPEG format) by an encoding unit (not shown) of the image processing unit 4. The image data recorded in the image recording unit 8 may be data acquired by imaging of the imaging unit 3 of the imaging apparatus 100 and recorded in the image recording unit, and may be data acquired by imaging of an external imaging apparatus (not shown) and transmitted to the imaging apparatus 100 and recorded in the image recording unit 8.

Also, the image recording unit 8 may be configured such that a recording medium (not shown) can be loaded to and unloaded from the image recording unit, and the image recording unit can control reading of data from a loaded recording medium and writing of data onto a recording medium.

<Reproducing Process>

Now, a reproducing process which is performed by the imaging apparatus 100 will be described with reference to FIGS. 2 to 4.

Figure 2:
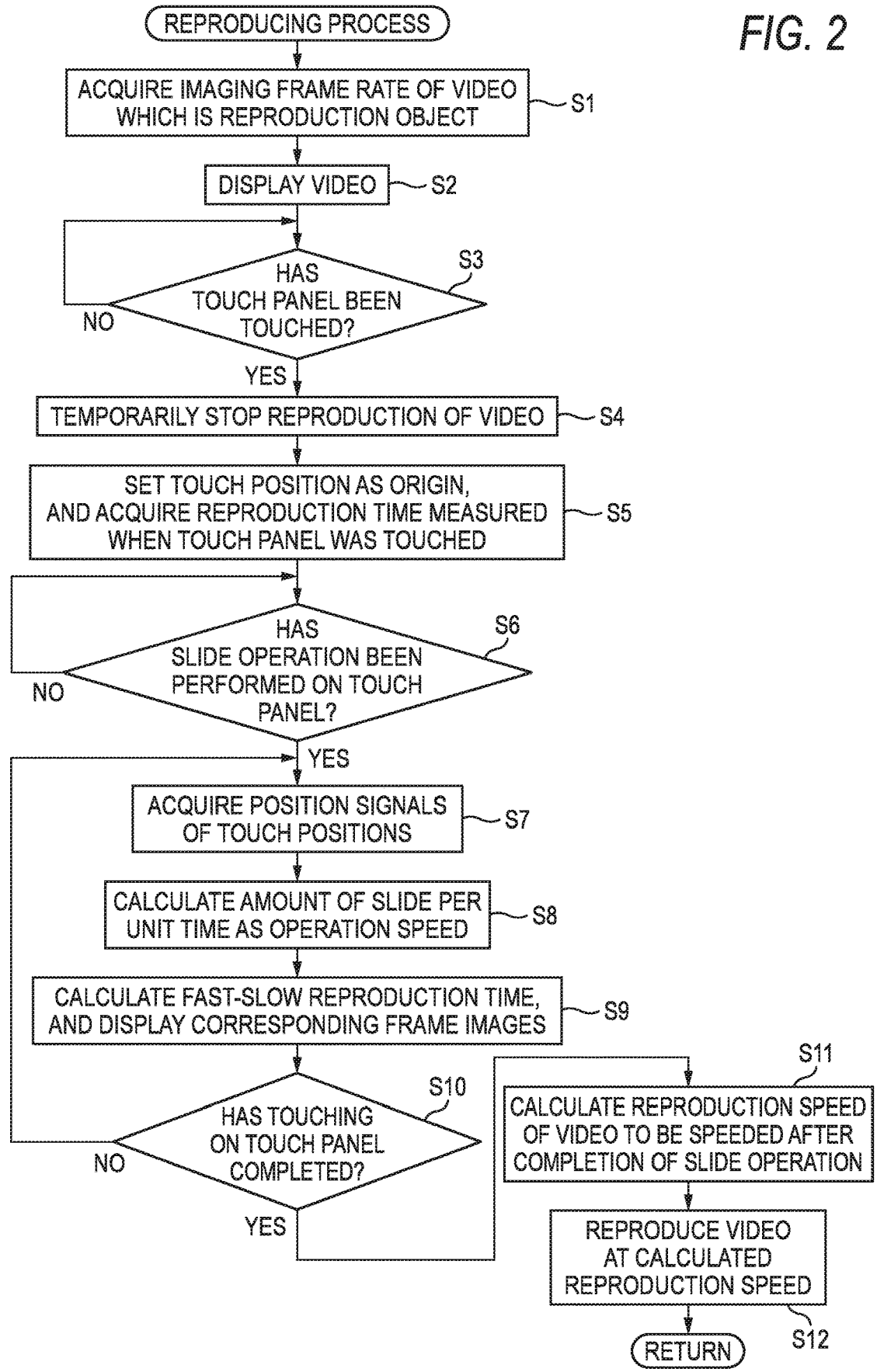
FIG. 2 is a flow chart illustrating examples of operations related to a reproducing process which is performed by the imaging apparatus of FIG. 1.

FIG. 2 is a flow chart illustrating example of operations related to the reproducing process. Also, FIG. 3 is a view for explaining fast-slow video reproduction in the reproducing process. Also, FIG. 4 is a view schematically illustrating an example of a video display mode in the reproducing process.

On the assumption that the ratio α of the time to perform fast-slow reproduction with respect to the amount of slide which is performed on the touch panel 6a by the user has been set to its initial value (for example, α=10), the reproducing process will be described below.

As shown in FIG. 2, if the user designates a video as a reproduction object from among videos recorded in the image recording unit 8 by performing a predetermined operation on the operation input unit 6, first, in STEP S1, the frame rate acquiring unit 7a of the operation processing unit 7 reads out the designated video from the image recording unit 8, and acquires the imaging frame rate at which the corresponding video was made.

Subsequently, in STEP S2, the first reproduction control unit 7c outputs a plurality of frame images constituting the reproduction object video and decoded by the image processing unit 4, to the display unit 5, whereby the video is displayed on the display panel 5a. At this time, display of the video may be performed in a manner in which the video is reproduced at a predetermined reproduction frame rate (for example, 30 fps), or in a manner in which the video is temporarily stopped at a predetermined frame image (for example, the first frame image).

Also, for example, the image processing unit 4 decodes data on some frame images, corresponding to a predetermined period, of the plurality of frame images constituting the reproduction object video, and stores the decoded data in a predetermined storage unit (for example, the memory 2), in advance, whereby it becomes possible to immediately display a frame image designated from the first reproduction control unit 7c, on the display panel 5a (see FIG. 12 and the like). This will be described in detail below.

Subsequently, in STEP S3, the first measuring unit 7b determines whether the touch panel 6a has been touched by the user.

If it is determined in STEP S3 that the touch panel 6a has not been touched ("NO" in STEP S3), the first measuring unit 7b repeatedly performs the process of determining whether the touch panel 6a has been touched, at predetermined time intervals.

If it is determined in STEP S3 that the touch panel 6a has been touched ("YES" in STEP S3), in STEP S4, the first reproduction control unit 7c temporarily stops reproduction of the video while keeping a frame image displayed when the user's touch on the touch panel 6a started. Subsequently, in STEP S5, the first measuring unit 7b acquires a position signal related to X and Y coordinates having the position of the touch as their origin and output from the touch panel 6a, and acquires the reproduction time Ttouch when the touch panel 6a was touched by the user, from the clocking unit (not shown).

Subsequently, in STEP S6, the first measuring unit 7b determines whether a slide operation has been performed on the touch panel 6a by the user.

If it is determined in STEP S6 that a slide operation has been not been performed n the touch panel 6a ("NO" in STEP S6), the first measuring unit 7b repeatedly performs the process of determining whether a slide operation has been performed on the touch panel 6a, at predetermined time intervals.

If it is determined in STEP S6 that a slide operation has been performed on the touch panel 6a ("YES" in STEP S6), in STEP S7, the first measuring unit 7b acquires position signals related to the X and Y coordinates of touch positions Xposition and sequentially output from the touch panel 6a. Further, after the user's touch on the touch panel 6a starts, at intervals of a unit time (for example, one second), the first measuring unit 7b calculates the amount of slide per unit time as the operation speed V (px/s) in STEP S8.

Subsequently, in STEP S9, the first reproduction control unit 7c subsequently calculates the time to perform fast-slow reproduction, based on values (α·Xposition) obtained by multiplying the ratio α by the touch positions Xposition output from the touch panel 6a, and the reproduction time Ttouch measured when the touch panel 6a was touched by the user. Thereafter, the first reproduction control unit 7c specifies frame images corresponding to the time to perform fast-slow reproduction, based on the imaging frame rate acquired by the frame rate acquiring unit 7a, and displays the frame images on the display panel 5a.

At this time, the first reproduction control unit 7c sets the reproduction frame rate and the decimation rate of fast-slow reproduction which is performed while the user is performing, such that the specified frame images are displayed on the display panel 5a.

Subsequently, in STEP S10, the first measuring unit 7b determines whether the user's touch on the touch panel 6a has been completed.

If it is determined that the touch on the touch panel 6a has not completed ("NO" in STEP S10), the first measuring unit 7b returns the reproducing process to STEP S7, and performs the process of STEP S7 and the subsequent processes. In other words, as described above, the processes of STEPS S7 to S9 are subsequently performed, whereby fast-slow reproduction of the video according to the user's slide operation on the touch panel 6a is performed.

If it is determined in STEP S10 that the touch on the touch panel 6a has been completed ("YES" in STEP S10), in STEP S11, the first reproduction control unit 7c multiplies the ratio α by the operation speed V (px/s) measured by the first measuring unit 7b when it was determined that the touch completed (when the touch panel 6a was finally touched by the user), thereby calculating the reproduction speed α·V of the video as the speed after the completion of the touch. Subsequently, in STEP S12, the first reproduction control unit 7c reproduces the video while keeping the calculated reproduction speed.

As described above, according to the imaging apparatus 100 of the first embodiment, the operation speed is sequentially measured while the user is touching the touch panel 6a, and reproduction of a video which is displayed on the display panel 5a is controlled based on the imaging frame rate of the video and the sequentially measured operation speed. Since the operation speed (for example, the speed of slide) which can vary while a touch operation (for example, a slide operation) is being performed on the touch panel 6a is sequentially measured and is reflected in control on display of a video, it is possible to display the video at a user's desired speed, whereby it is possible to easily display user's desired images.

Especially, fast-slow reproduction of a video is controlled, for example, by changing at least one of the reproduction frame rate and the decimation rate according to the imaging frame rate, so as to perform fast-slow reproduction of the video to maintain the fast-slow reproduction time according to the amount of slide. Therefore, fast-slow reproduction of a video is performed for the constant time according to the amount of slide, regardless of the imaging frame rate of the reproduction object video, and even in a case of reproducing a plurality of videos different from one another in their imaging frame rates, it is possible to easily display user's desired images. In other words, in a case of searching for user's desired images while reproducing videos fast or slowly, the user does not need to change the amount of slide on the touch panel 6a according to the imaging frame rates of the reproduction object videos, and can easily specify user's desired images by instinctive operations.

Also, after a user's slide operation on the touch panel 6a is completed, reproduction of a video is controlled such that the video is reproduced at a reproduction frame rate according to the operation speed measured when the slide operation is completed. Therefore, it is possible to link the reproduction speed during fast-slow reproduction of a video and the reproduction speed of the video after the fast-slow reproduction, whereby the user can change the reproduction speed by an instinctive operation while watching the video. Especially, in a case where the operation speed measured when a slide operation is completed is 0, reproduction of a video is temporarily stopped while a frame image of the video displayed on the display panel 5a when the slide operation is completed is kept, whereby the user can easily perform display of desired images by instinctive operations.

Also, while the user is performing a slide operation at a certain position on the touch panel 6a, the operation speed is sequentially measured. Therefore, it is unnecessary to display information such as an indicator for enabling the user to perform a slide operation, and the user can perform an operation at any position on the touch panel 6a Therefore, it is possible to improve operability enabling the user to searching for desired images.

Also, according to the first embodiment described above, while the user is performing a touch operation on the touch panel 6a, the operation speed is sequentially measured, and reproduction of a video which is displayed on the display panel 5a is controlled based on the sequentially measured operation speed. However, this is merely an example, and does not limit the present invention.

For example, the first measuring unit 7b may sequentially measure the acceleration of a user's slide operation at a certain position on the touch panel 6a. In this case, while the user's slide operation is performed, the first reproduction control unit 7c may continuously control a switching speed at which an image (such as a still image or a frame image constituting a video) displayed on the display panel 5a is switched to another image, such that the switching speed varies depending on the acceleration of the slide operation subsequently measured. Also, in this case, after the user's slide operation on the touch panel 6a is completed, control may be performed such that switching of an image displayed on the display panel 5a to another image is performed at the switching speed calculated when the slide operation is completed.

According to this configuration, while a slide operation is performed on the touch panel 6a, the variable acceleration of the slide operation is sequentially measured, and is reflected in the speed of switching of a displayed image to another image. Therefore, it is possible to display while switching consecutive images at a user's desired speed, whereby it is possible to easily display user's desired images.

Second Embodiment

Figure 6:
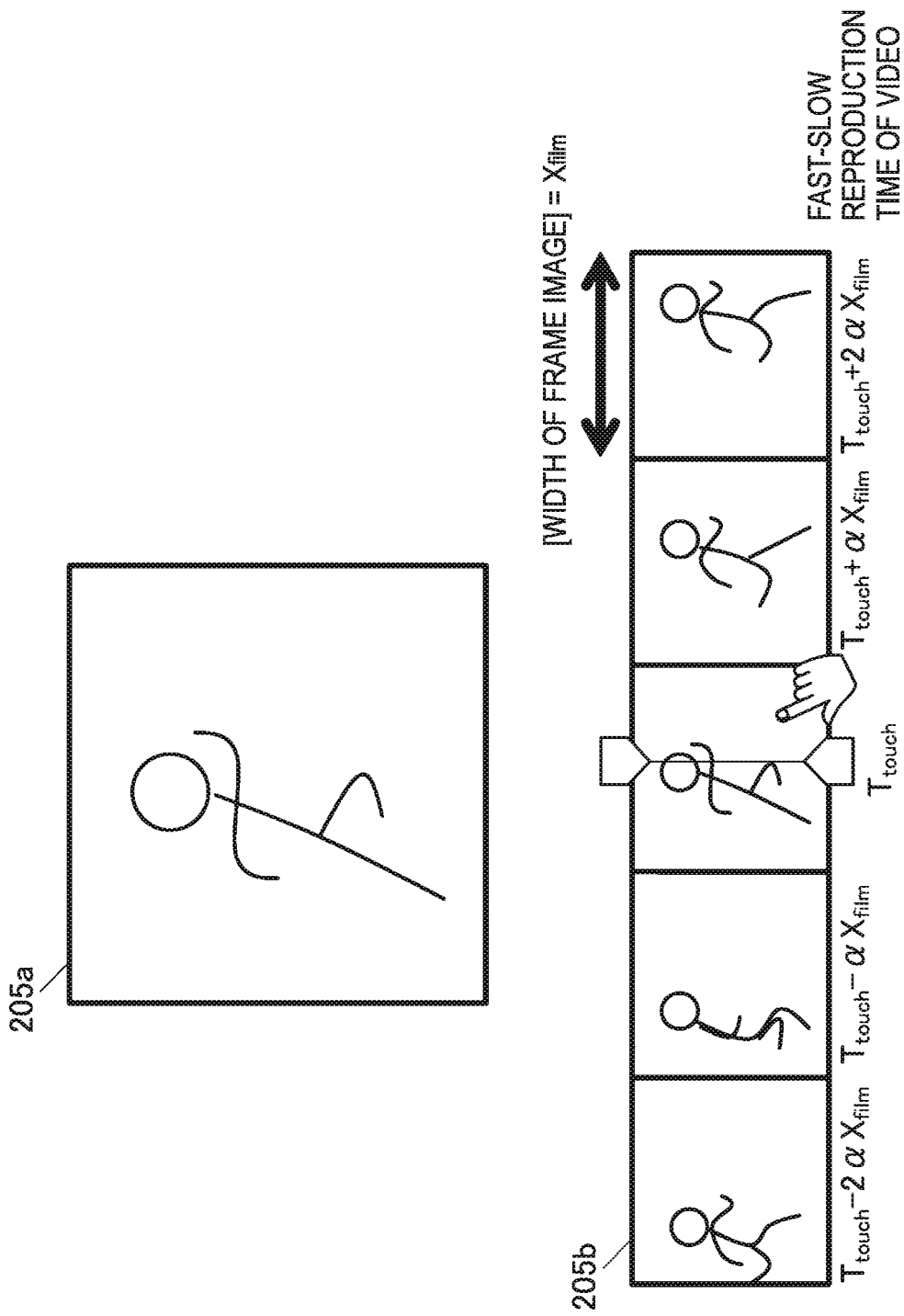
FIG. 6 is a view schematically illustrating an example of a video display mode of a display unit of the imaging apparatus of FIG. 5.
Figure 7:
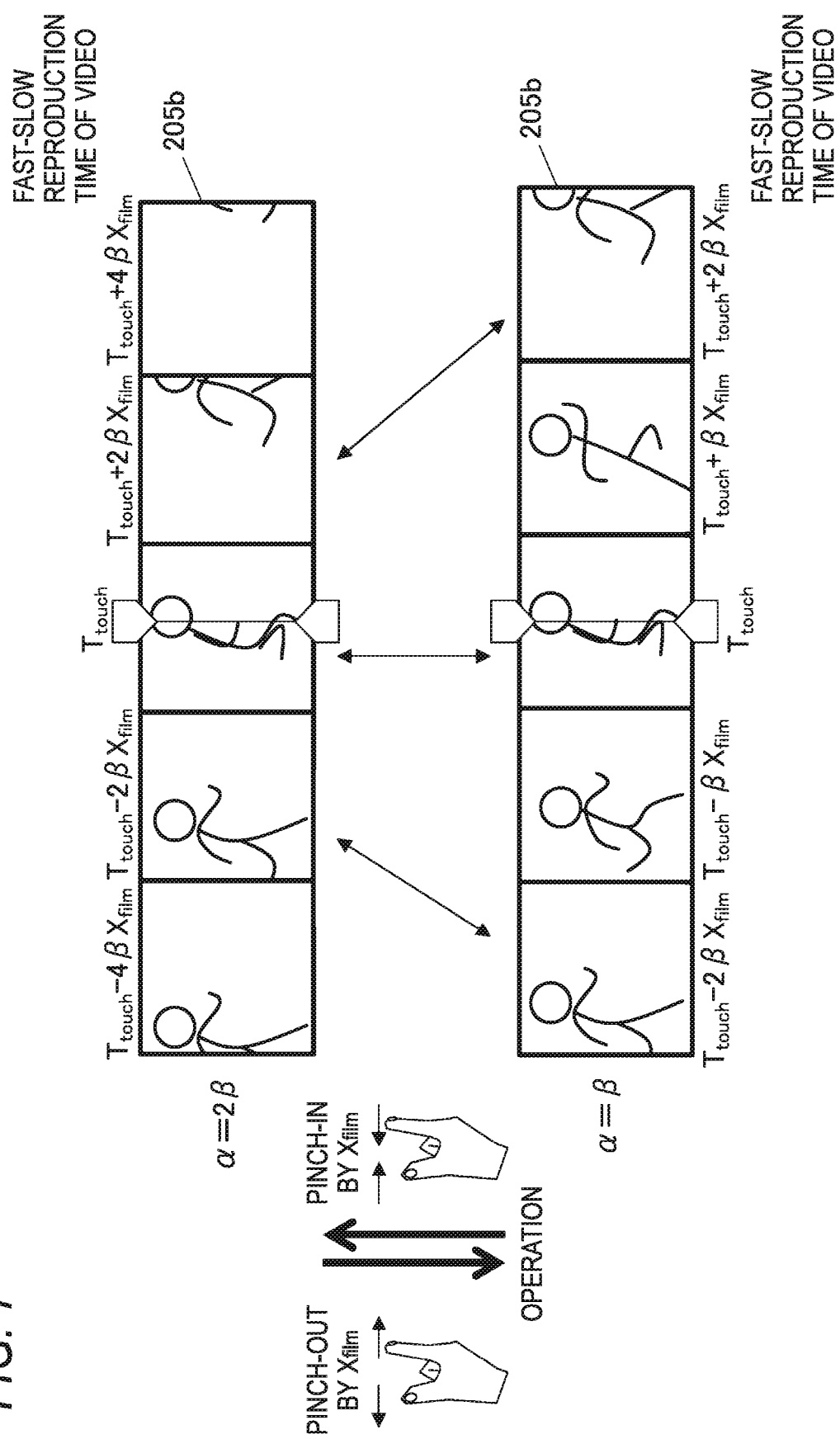
FIG. 7 is a view for explaining a frame image display mode of a second display panel of the imaging apparatus of FIG. 5.

Hereinafter, an imaging apparatus 200 of a second embodiment will be described with reference to FIGS. 5 to 7.

Figure 5:
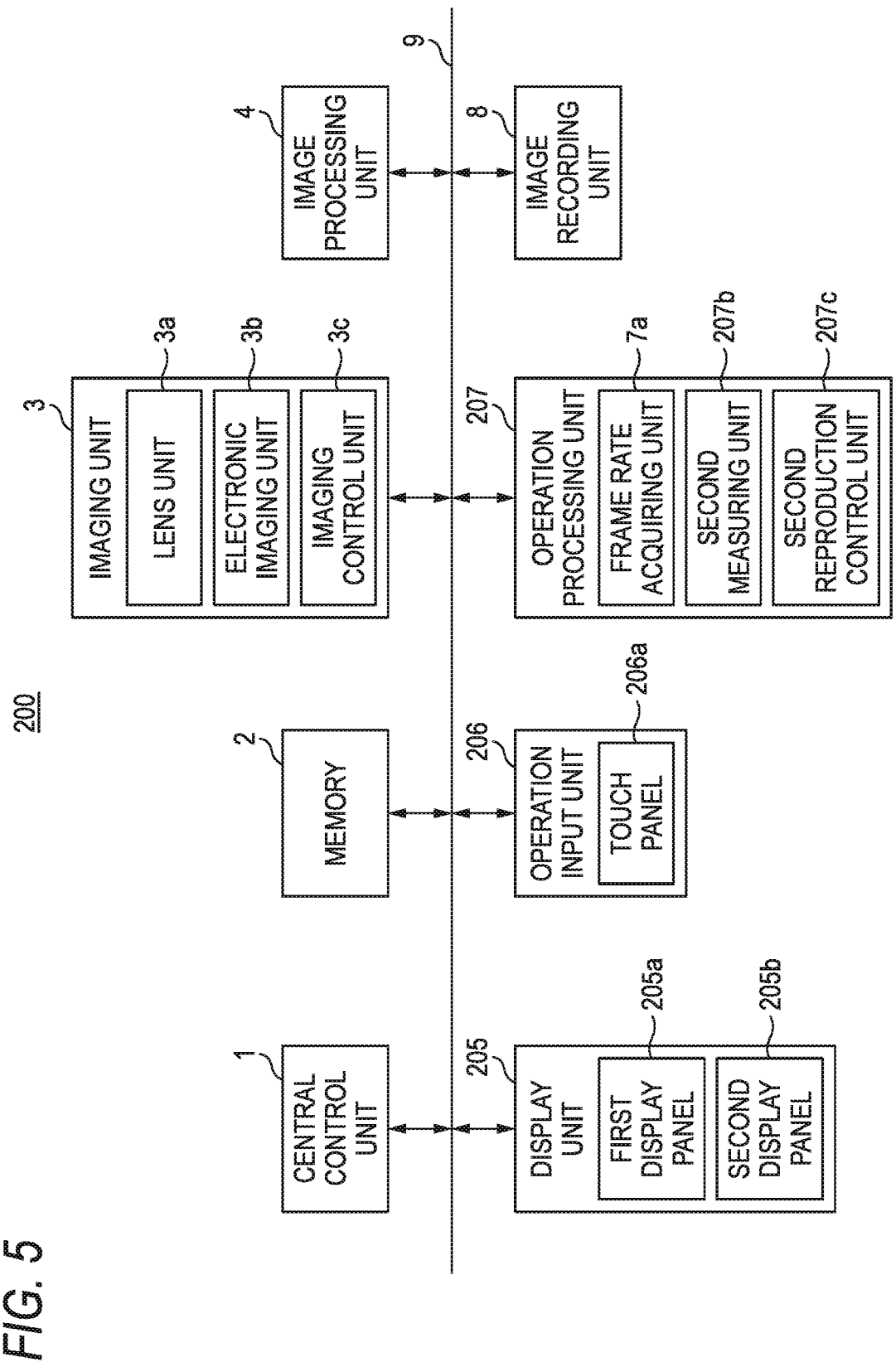
FIG. 5 is a block diagram illustrating a rough configuration of an imaging apparatus of a second embodiment according to the present invention.

FIG. 5 is a block diagram illustrating a rough configuration of the imaging apparatus 200 of the second embodiment according to the present invention. Also, FIG. 6 is a view schematically illustrating an example of a video display mode of a display unit 205 of the imaging apparatus 200. Also, FIG. 7 is a view for explaining a frame image display mode of a second display panel 205b to be described below.

The imaging apparatus 200 of the second embodiment is configured to independently display a reproduction object video and a plurality of frame images constituting that video, such that the user can perform a slide operation on a part of a touch panel 206a corresponding to display of a plurality of frame images (see FIG. 5).

Also, the configuration and function of the imaging apparatus 200 except points to be described below are almost the same as those of the imaging apparatus 100 of the first embodiment, and thus a detailed description thereof will not be made.

As shown in FIG. 5, a display unit 205 includes a first display panel 205a which displays a reproduction object video, and the second display panel 205b which is long in a direction (for example, a transverse direction) in which a plurality of frame images constituting the reproduction object video is displayed in line.

Also, an operation input unit 206 includes the touch panel 206a provided integrally with the second display panel 205b.

An operation processing unit 207 includes a frame rate acquiring unit 7a, a second measuring unit 207b, and a second reproduction control unit 207c.

The second reproduction control unit 207c independently controls display of a video and display of a plurality of frame images constituting the video, such that the video is displayed on the first display panel 205a and the frame images are displayed on the second display panel 205b. Specifically, with respect to a plurality of frame images constituting the video, for example, the second reproduction control unit 207c displays the thumbnails of the some frame images corresponding to reproduction times, at positions corresponding to frame image widths Xfilm, in the display area of the second display panel 205b (see FIG. 6). In other words, when the video is displayed on the first display panel 205a, the second reproduction control unit 207c displays a thumbnail of a frame image displayed on the first display panel, at a predetermined position of the second display panel 205b (for example, at the center), and displays thumbnails of images to be displayed in a case of performing forward fast-slow reproduction of the video and thumbnail of images to be displayed in a case of performing backward fast-slow reproduction of the video, as representative images, on the second display panel 205b.

Also, the second reproduction control unit 207c may display fast-slow reproduction times at predetermined positions in association with the plurality of displayed frame images. For example, in a case of performing forward fast-slow reproduction of the video, the ratio $\alpha$ of the time to perform fast-slow reproduction with respect to the amount of slide is multiplied by N times the width Xfilm of a frame image (wherein "N" is an integer), whereby a value is obtained, and the obtained value is added to the reproduction time Ttouch when the touch panel 206a was touched, whereby fast-slow reproduction times (such as (Ttouch+$\alpha$·Xfilm) and (Ttouch+2$\alpha$·Xfilm)) corresponding to the individual frame images are calculated. Meanwhile, in a case of performing backward fast-slow reproduction of the video, the ratio $\alpha$ of the time to perform fast-slow reproduction with respect to the amount of slide is multiplied by N times the width Xfilm of a frame image (wherein "N" is an integer), whereby a value is obtained, and the obtained value is subtracted from the reproduction time Ttouch when the touch panel 206a was touched, whereby fast-slow reproduction times (such as (Ttouch−$\alpha$·Xfilm) and (Ttouch−2$\alpha$·Xfilm)) corresponding to the individual frame images are calculated.

Also, the imaging apparatus 200 of the second embodiment can adjust the ratio $\alpha$ of the time to perform fast-slow reproduction with respect to the amount of slide.

In other words, if the user performs a touch operation, different from a slide operation, on the part of the touch panel 206a corresponding to display of a plurality of frame images, the second measuring unit 207b measures the operation amount of the corresponding operation. Then, the second reproduction control unit 207c displays some frame images corresponding to time intervals varying depending on the operation amount of the touch operation, different from a slide operation, measured by the second measuring unit 207b, in line, on the second display panel 205b.

Specifically, for example, if the user performs a pinch operation on the touch panel 206a provided integrally with the second display panel 205b displaying a plurality of frame images, the second measuring unit 207b acquires position signals related to the X and Y coordinates of touch positions and output from the touch panel 6a, and calculates the interval of the pinch operation. The second reproduction control unit 207c changes the ratio $\alpha$ of the time to perform fast-slow reproduction with respect to the amount of slide, depending on the operation amount of the pinch operation, and displays thumbnails of a plurality of corresponding frame images in the display area of the second display panel 205b (see FIG. 7).

For example, before a pinch operation is performed on the touch panel 206a by the user, the second reproduction control unit 207c sets 13 as the ratio $\alpha$ of the time to perform fast-slow reproduction with respect to the amount of slide, and displays thumbnails of a plurality of corresponding frame images in the display area of the second display panel 205b as described above. In this case, for example, fast-slow reproduction times corresponding to the individual frame images are calculated as (Ttouch+β·Xfilm), (Ttouch+2β·Xfilm), (Ttouch−β·Xfilm), and (Ttouch−2β·Xfilm).

In this state, if a pinch-in operation corresponding to the width Xfilm of one frame image is performed on the touch panel 206a, the second reproduction control unit 207c sets 2β as the ratio α of the time to perform fast-slow reproduction with respect to the amount of slide, and displays thumbnails of frame images corresponding to fast-slow reproduction times (for example, (Ttouch+2β·Xfilm), (Ttouch+4β·Xfilm), (Ttouch−2β·Xfilm), and (Ttouch−4β·Xfilm)) in the display area of the second display panel 205b. In contrast, in that state, if a pinch-out operation corresponding to the width Xfilm of one frame image is performed on the touch panel 206a, the second reproduction control unit 207c sets β as the ratio α of the time to perform fast-slow reproduction with respect to the amount of slide, and displays the of a plurality of corresponding frame images in the display area of the second display panel 205b as described above.

In the second embodiment described above, the first display panel 205a which displays a reproduction object video, and the second display panel 205b which displays a plurality of frame images are separately provided. However, for example, although not shown, one display panel in which its display area is partitioned into an area for displaying a video and an area for displaying a plurality of frame images may be provided. In this case, the second reproduction control unit 207c independently controls display of each area.

As described above, according to the imaging apparatus 200 of the second embodiment, similarly in the first embodiment, while a touch operation (for example, a slide operation) is being performed on the touch panel 206a, the operation speed (for example, the speed of slide) which is variable is sequentially measured, and is reflected in control on display of a video. Therefore, it is possible to display a video at a user's desired speed, whereby it is possible to easily display user's desired images. Especially, display of a reproduction object video and single-line display of a plurality of frame images constituting that video are independently performed, and while the user performs a slide operation on the part of the touch panel 206a corresponding to frame image display, the operation speed is sequentially measured. Therefore, it is possible to show examples of frame images to be reproduced fast or slowly according to the amount of user's slide, as representative images, whereby the user can perform fast-slow reproduction by instinctive operations while watching the representative images. Also, since a plurality of frame images corresponding to time intervals varying depending the operation amount of a touch operation (for example, a pinch operation) different from a slide operation is displayed in line, it is possible to more easily perform display of user's desired images by changing the time to perform fast-slow reproduction with respect to the amount of slide.

Also, in the second embodiment described above, the ratio α of the time to perform fast-slow reproduction with respect to the amount of slide is adjusted in a case where the user performs a pinch operation on the touch panel 206a. However, this is an example, and does not limit the present invention. For example, the ratio α may be adjusted according to the number of user's fingers touching the touch panel 206a. Specifically, for example, in a case where the number of user's fingers touching the touch panel 206a is one, the ratio α may be set to β, and in a case where the number of user's fingers touching the touch panel 206a is two, the ratio α may be set to 2β.

Third Embodiment

Hereinafter, an imaging apparatus 300 of a third embodiment will be described with reference to FIGS. 8 to 10.

Figure 8:
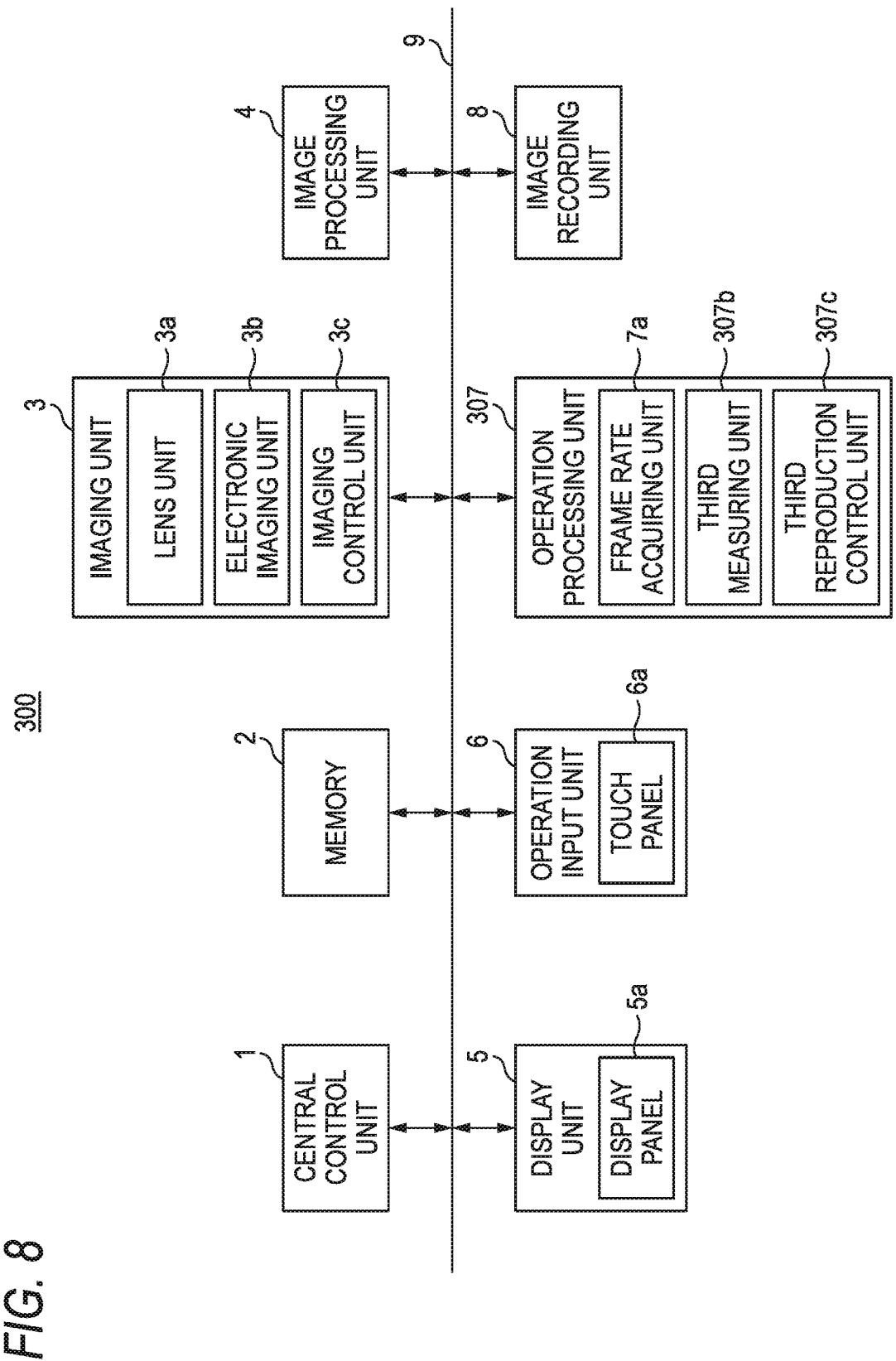
FIG. 8 is a block diagram illustrating a rough configuration of an imaging apparatus of a third embodiment according to the present invention.

FIG. 8 is a block diagram illustrating a rough configuration of the imaging apparatus 300 of the third embodiment according to the present invention.

If an arc-like slide operation is performed on the touch panel 6a by the user, the imaging apparatus 300 of the third embodiment controls video reproduction based on the operation speed which is measured while the slide operation is performed.

Also, the configuration and function of the imaging apparatus 300 except points to be described below are almost the same as those of the imaging apparatus 100 of the first embodiment, and thus a detailed description thereof will not be made.

As shown in FIG. 8, an operation processing unit 307 includes a frame rate acquiring unit 7a, a third measuring unit 307b, and a third reproduction control unit 307c.

While the user performs an arc-like slide operation on the touch panel 6a, the third measuring unit 307b subsequently measures the operation speed.

Here, the arc-like slide operation may be a rotation operation which is performed by an angle less than 360 degrees, that is, an operation which does not draw a circle, or may be a rotation operation which is performed by an angle larger than 360 degrees.

Specifically, for example, if the touch panel 6a is touched by the user, a circular indicator I (see FIG. 10) is displayed on the display panel 5a of the display unit 5. The indicator I has its polar coordinate origin at a point apart from the user's touch position by a predetermined distance "d". If the user performs a slide operation to rotate the indicator I in a predetermined direction (for example, the clockwise direction), the third measuring unit 307b sequentially acquires position signals related to the X and Y coordinates of touch positions and output from the touch panel 6a. Then, the third measuring unit 307b disposes the subsequently acquired touch positions at a polar coordinate system, and calculates the rotation angle θ position per unit time (for example, the number of touched pixels per one second), as the operation speed ω (px/s). If the user's arc-like slide operation on the touch panel 6a is completed, the first measuring unit 7b acquires the touch position of the touch panel 6a finally touched by the user.

The circular indicator I is displayed only for a period when the touch panel 6a is touched by the user. However, this is an example, and does not limit the present invention, and can be appropriately and arbitrarily modified. Also, a user's touch operation on the touch panel 6a may be a single touch operation as shown in FIG. 10, or may be a multi-touch operation (not shown) by which two or more points are simultaneously touched. For example, in a case of performing a multi-touch operation with a thumb and a forefinger, the third measuring unit 307b may set the touch position of the thumb as the polar coordinate origin. In this state, if the forefinger rotates such that its touch position changes, the rotation angle θ position may be measured.

For example, if it is assumed that the ratio of the time to perform fast-slow reproduction with respect to the amount of slide which is performed on the touch panel 6a by the user is α (for example, the initial value of α is 10), the third reproduction control unit 307c subsequently calculates the time to perform fast-slow reproduction (fast-slow reproduction time), based on values (α·θ position) obtained by multiplying the ratio α by the rotation angles θ position calculated by the third measuring unit 307b, and the reproduction time Ttouch when the touch panel 6a was touched by the user. Also, the third reproduction control unit 307c multiplies the ratio α by the operation speed ω (px/s) which is the rotation angle θ position per unit time subsequently measured by the third measuring unit 307b, thereby calculating the reproduction speed α·ω for performing fast-slow reproduction of a video.

Also, if the user's arc-like slide operation on the touch panel 6a is completed (if the touch is released), the third reproduction control unit 307c controls reproduction of the video such that the video is reproduced at the reproduction frame rate according to the operation speed calculated when the slide operation is completed. For example, the third reproduction control unit 307c multiplies the ratio α by the operation speed ω (px/s) measured by the third measuring unit 307b when the touch panel 6a was finally touched by the user, thereby calculating the reproduction speed α·ω of the video, as the speed after the arc-like slide operation (after release of the touch).

<Reproducing Process>

Now, a reproducing process of the imaging apparatus 300 will be described with reference to FIGS. 9 and 10.

Figure 9:
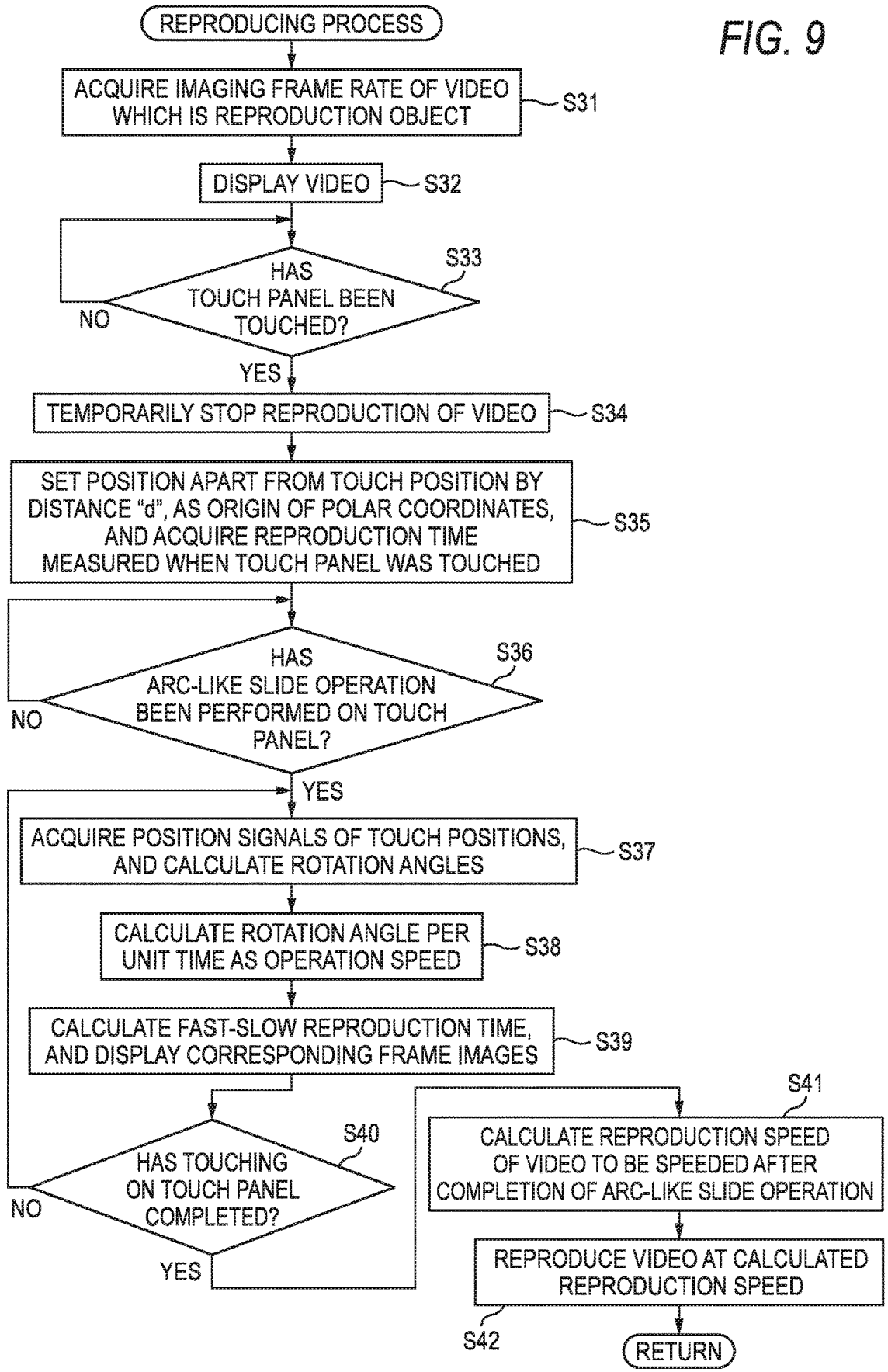
FIG. 9 is a flow chart illustrating examples of operations related to a reproducing process which is performed by the imaging apparatus of FIG. 8.
Figure 10:
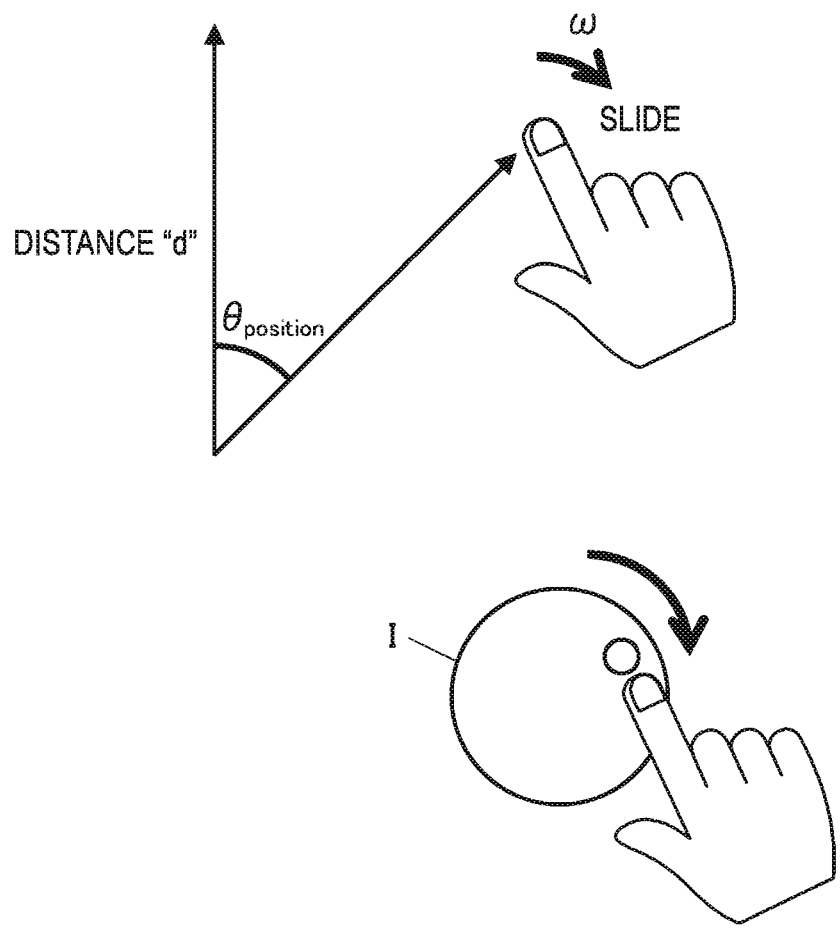
FIG. 10 is a view for explaining an arc-like slide operation in the reproducing process of FIG. 9.

FIG. 9 is a flow chart illustrating examples of operations related to the reproducing process. Also, FIG. 10 is a view for explaining an arc-like slide operation in the reproducing process.

On the assumption that the ratio α of the time to perform fast-slow reproduction with respect to the amount of arc-like slide which is performed on the touch panel 6a by the user has been set to its initial value (for example, α=10), the reproducing process will be described below. Also, it is assumed that the rotation direction (for example, the clockwise direction) of a user's arc-like slide operation is associated with the forward direction in which a video is reproduced fast or slowly.

As shown in FIG. 9, if the user designates a vide as a reproduction object from among videos recorded in the image recording unit 8 by performing a predetermined operation on the operation input unit 6, first, in STEP S31, almost similarly in the reproducing process of the first embodiment described above, the frame rate acquiring unit 7a of the operation processing unit 307 reads out the designated video from the image recording unit 8, and acquires the imaging frame rate at which the corresponding video was made.

Subsequently, in STEP S32, almost similarly in the reproducing process of the first embodiment described above, the third reproduction control unit 307c outputs a plurality of frame images constituting the reproduction object video and decoded by the image processing unit 4, to the display unit 5, whereby the video is displayed on the display panel 5a.

Subsequently, in STEP S33, almost similarly in the reproducing process of the first embodiment described above, the third measuring unit 307b determines whether the touch panel 6a has been touched by the user.

If it is determined in STEP S33 that the touch panel 6a has not been touched ("NO" in STEP S33), the third measuring unit 307b repeatedly performs the process of determining whether the touch panel 6a has been touched, at predetermined time intervals.

If it is determined in STEP S33 that the touch panel 6a has been touched ("YES" in STEP S33), in STEP S34, the third reproduction control unit 307c temporarily stops reproduction of the video while keeping a frame image displayed when the user's touch on the touch panel 6a started. Subsequently, in STEP S35, the third measuring unit 307b sets a point apart from the touch position output from the touch panel 6a by the predetermined distance "d", as the origin, and acquires the reproduction time Ttouch measured when the touch panel 6a was touched by the user, from the clocking unit (not shown). At this time, the circular indicator I (see FIG. 10) is displayed on the display panel 5a of the display unit 5.

Subsequently, in STEP S36, the third measuring unit 307b determines whether an arc-like slide operation, for example, for rotating the circular indicator I, has been performed on the touch panel 6a by the user.

If it is determined in STEP S36 that an arc-like slide operation has not been performed on the touch panel 6a ("NO" in STEP S36), the third measuring unit 307b repeatedly performs the process of determining whether an arc-like slide operation has been performed on the touch panel 6a, at predetermined time intervals.

If it is determined in STEP S36 that an arc-like slide operation has been performed on the touch panel 6a ("YES" in STEP S36), in STEP S37, the third measuring unit 307b subsequently acquires position signals related to the X and Y coordinates of touch positions and output from the touch panel 6a, and calculates the rotation angles θ position. Further, after the user's arc-like slide operation on the touch panel 6a starts, at intervals of a unit time (for example, one second), the third measuring unit 307b calculates the rotation angle θ position per unit time, as the operation speed ω (px/s), in STEP S38.

Subsequently, in STEP S39, the third reproduction control unit 307c subsequently calculates the time to perform fast-slow reproduction, based on values (α·θ position) obtained by multiplying the ratio α by the rotation angles θ position calculated by the third measuring unit 307b, and the reproduction time Ttouch measured when the touch panel 6a was touched by the user. Thereafter, almost similarly in the reproducing process of the first embodiment described above, the third reproduction control unit 307c specifies frame images corresponding to the time to perform fast-slow reproduction, based on the imaging frame rate acquired by the frame rate acquiring unit 7a, and displays the frame images on the display panel 5a.

Subsequently, in STEP S40, almost similarly in the reproducing process of the first embodiment described above, the third measuring unit 307b determines whether the user's touch on the touch panel 6a has been completed.

If it is determined in STEP S40 that the touch on the touch panel 6a has not completed ("NO" in STEP S40), the third measuring unit 307b returns the reproducing process to STEP S37, and performs the process of STEP S37 and the subsequent processes. In other words, as described above, the processes of STEPS S37 to S39 are subsequently performed, whereby fast-slow reproduction of the video is performed while the user's arc-like slide operation is performed on the touch panel 6a.

If it is determined in STEP S40 that the touch on the touch panel 6a has been completed ("YES" in STEP S40), in STEP S41, almost similarly in the reproducing process of the first embodiment described above, the third reproduction control unit 307c multiplies the ratio α by the operation speed ω (px/s) measured by the third measuring unit 307b when it was determined that the touch is completed, thereby calculating the reproduction speed α·ω of the video as the speed after the completion of the touch. Subsequently, in STEP S42, almost similarly in the reproducing process of the first embodiment described above, the third reproduction control unit 307c reproduces the video while keeping the calculated reproduction speed.

As described above, according to the imaging apparatus 300 of the third embodiment, similarly in the first embodiment, while a touch operation (for example, a slide operation) is being performed on the touch panel 6a, the operation speed (for example, the speed of slide) which is variable is sequentially measured and is reflected in control on display of a video. Therefore, it is possible to display the video at a user's desired speed, whereby it is possible to easily display user's desired images. Especially, while the user performs an arc-like slide operation on the touch panel 6a, the operation speed is sequentially measured. Although the touch panel 6a is limited in longitudinal size and transverse size, if a slide operation is performed in an arc shape, the operation amount of the slide operation is not limited. Also, even in a case where a large amount of slide is required for fast-slow reproduction for a relatively long period, it is possible to continuously perform a touch operation without release.

<First Modification>

Hereinafter, an imaging apparatus 300A according to a first modification of the third embodiment will be described with reference to FIG. 11.

Figure 11:
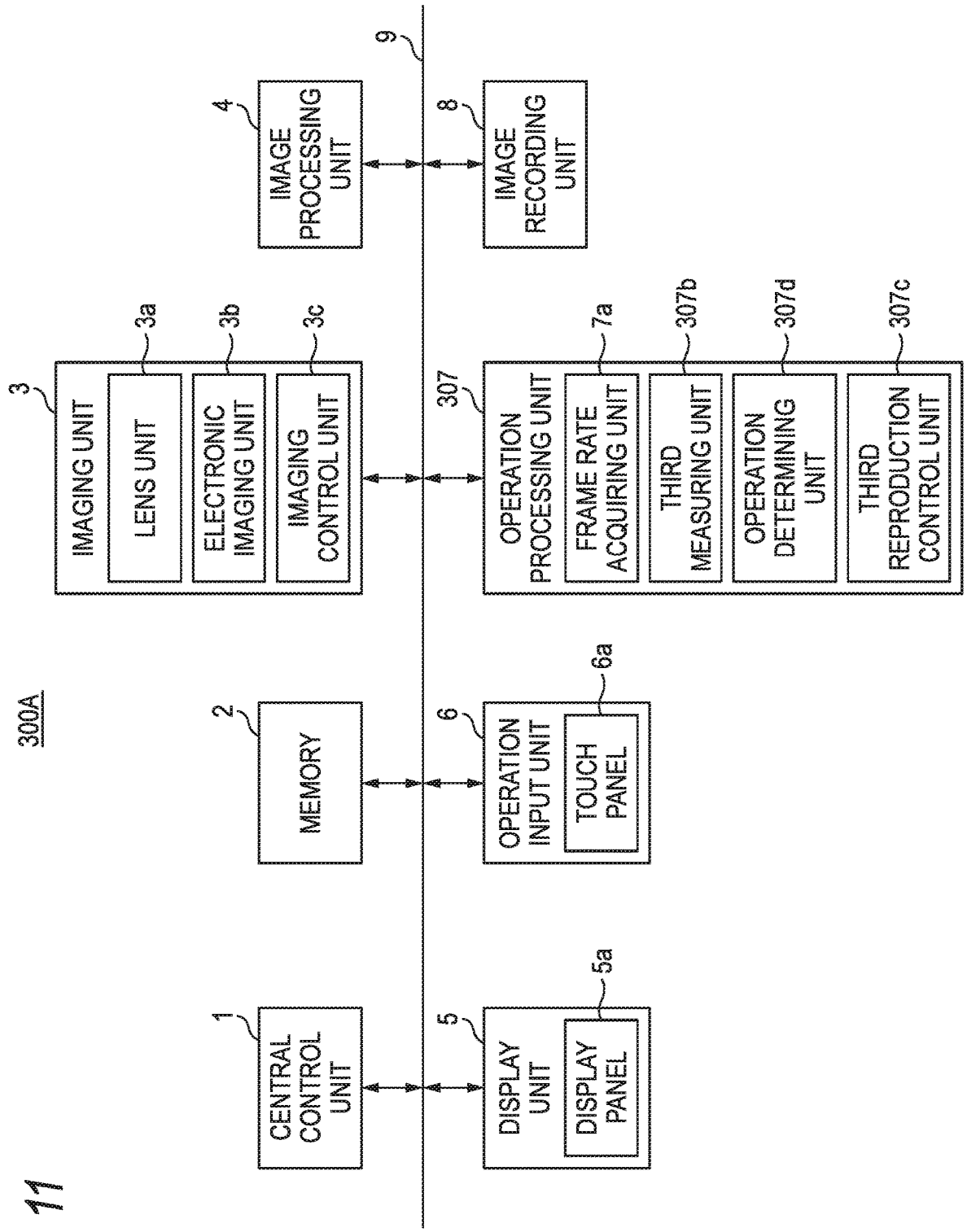
FIG. 11 is a block diagram illustrating a rough configuration of an imaging apparatus according to a first modification of the third embodiment.

FIG. 11 is a block diagram illustrating a rough configuration of the imaging apparatus 300A according to the first modification.

Also, the configuration and function of the imaging apparatus 300A except points to be described below are almost the same as those of the imaging apparatus 300 of the third embodiment, and thus a detailed description thereof will not be made.

As shown in FIG. 11, an operation processing unit 307 includes an operation determining unit 307d, in addition to a frame rate acquiring unit 7a, a third measuring unit 307b, and a third reproduction control unit 307c.

The operation determining unit (a determining unit) 307d determines whether the type of a user's slide operation on the touch panel 6a is a linear slide operation or an arc-like slide operation.

In other words, if the user starts a slide operation on the touch panel 6a, the operation determining unit 307d sequentially acquires position signals related to the X and Y coordinates and sequentially output from the touch panel 6a. Further, the operation determining unit 307d calculates the amounts of touch position displacement in the X direction and the Y direction per unit time, and determines whether the type of the user's slide operation is a linear slide operation or an arc-like slide operation, based on the amounts of displacement in the X direction and the Y direction. For example, in a case where the user's slide operation is a linear slide operation in the longitudinal direction or the transverse direction, any one of the displacement amounts in the X direction and the Y direction decreases, and the other one increases. Also, in a case where the ratio of the displacement amounts in the X direction and the Y direction is equal to or larger than a predetermined threshold value, the operation determining unit 307d determines that the user's slide operation is an arc-like slide operation.

In a case where the operation determining unit 307d determines that the user's slide operation is an arc-like slide operation, the third reproduction control unit 307c specifies the center of the circle from the trajectory of the slide operation, and performs control such that the specified circle center is distinguishably displayed on the display panel 5a.

Also, the third reproduction control unit 307c may change the content of control on video reproduction, according to the type of the user's slide operation. For example, the ratio α of the time to perform fast-slow reproduction with respect to the amount of slide during an arc-like slide operation can be set to be larger or smaller than that during a linear slide operation. In this case, in a case where the user searches for a desired image, the user can perform fast-slow reproduction while switching the two types of slide operations, and thus it is possible to improve operability.

As described above, according to the imaging apparatus 300A of the first modification, where the type of a user's slide operation on the touch panel 6a is a linear slide operation or an arc-like slide operation is determined, and in a case where it is determined that the slide operation is an arc-like slide operation, the center of a circle which is specified from the trajectory of the slide operation is distinguishably displayed. Therefore, it is possible to further improve operability enabling the user to perform a slide operation in an arc shape on the touch panel 6a.

Also, the present invention is not limited to the first to third embodiments described above, and various improvements and design changes may be made to the embodiments without departing from the scope of the present invention.

Hereinafter, a process of decoding a plurality of frame images constituting a reproduction object video will be described with reference to FIGS. 12 to 18.

In the imaging apparatuses 100, 200, 300, and 300A of the first to third embodiments and the first modification, the image processing unit 4 may perform a process of decoding some frame images, corresponding to a predetermined period, of a plurality of frame images constituting a video to be reproduced, in advance. Subsequently, the memory 2 which is a storage unit temporarily stores the frame images, corresponding to the predetermined period, decoded by the image processing unit 4.

In other words, the image processing unit 4 performs a process of decoding a plurality of frame images read from the image recording unit 8 by the operation processing unit 7, according to the encoding system of the corresponding video (for example, an MPEG encoding system). Specifically, for example, with reference to the position of a frame image which is being reproduced by the first reproduction control unit 7c of the operation processing unit 7, the image processing unit 4 performs a process of decoding some frame images, corresponding to a predetermined period, of a plurality of frame images constituting a video, in each of the current reproduction direction and the opposite direction to the current reproduction direction.

Also, the image processing unit 4 specifies the decoding process order of frame images corresponding to the predetermined period and positioned in the current reproduction direction and frame images corresponding to the predetermined period and positioned in the opposite direction, according to whether the current reproduction direction of the video is the forward direction or the backward direction, and then performs the corresponding decoding process. For example, in a case of a plurality of frame images constituting a video encoded by an MPEG encoding system, the image processing unit 4 may specify the decoding process order of frame images corresponding to the predetermined period, in units of a GOP (group of pictures) which is composed of a plurality of consecutive frame images and includes one I-picture and P-pictures following the I-picture.

Specifically, with respect to a GOP including a frame image which is being reproduced, the image processing unit 4 specifies a predetermined number of GOPs (for example, two GOPs) in each of the reproduction direction of the video and the opposite direction to the reproduction direction, as targets of the decoding process. Also, the image processing unit 4 specifies the decoding process order such that the GOPs positioned in the current reproduction direction of the video are decoded in priority to the GOPs positioned in the opposite direction.

Also, the total number of frame images, corresponding to the predetermined period, to be decoded by the image processing unit 4 can be appropriately and arbitrarily changed, for example, according to the capacity of the storage area of the memory 2. The memory 2 has a ring buffer for temporarily storing decoded frame images, and according to the capacity of the storage area of the ring buffer, the amount of frame images to be decoding process varies.

Now, an example of the decoding process will be described in detail with reference to FIGS. 12A and 12B.

Figure 12A:
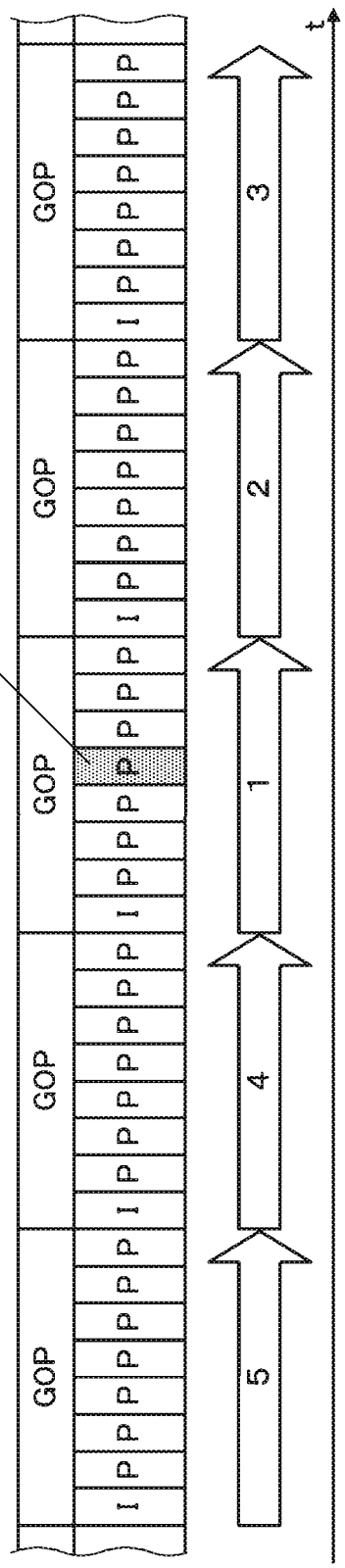
FIGS. 12A and 12B are views for explaining a decoding process which is performed by an image processing unit.
Figure 12B:
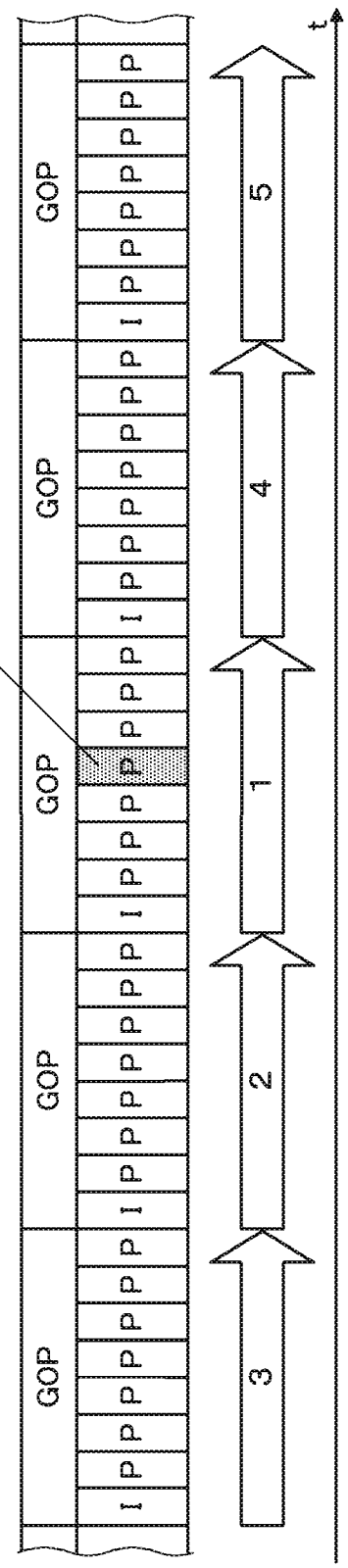

FIGS. 12A and 12B are views for explaining the decoding process which is performed by the image processing unit 4. FIG. 12A corresponds to a case of performing fast-slow reproduction in the forward direction, and FIG. 12B corresponds to a case of performing fast-slow reproduction in the backward direction. In FIGS. 12A and 12B, "I" represents an I-picture, and "P" represents a P-picture. Also, white arrows with black outlines represent the decoding process direction, and numbers in those arrows represent the decoding process order.

For example, in a case of performing fast-slow reproduction of a video in the forward direction (see FIG. 12A), first, the image processing unit 4 sequentially decodes some frame images, constituting a GOP including a frame image which is being reproduced (in FIG. 12A, a P-picture marked with dots), of a plurality of frame images constituting the reproduction object video, along the time axis from an I-picture (an arrow numbered "1"). Subsequently, the image processing unit 4 sets, as a processing target, a GOP adjacent to the GOP including the frame image which is being reproduced, that is, the previously decoded GOP, and positioned after the previously decoded GOP on the time axis, and sequentially decodes a plurality of frame images constituting the corresponding GOP, along the time axis (an arrow numbered "2"). Subsequently, the image processing unit 4 sets, as a processing target, a GOP adjacent to the previously decoded GOP and positioned after the previously decoded GOP on the time axis, and sequentially decodes a plurality of frame images constituting the corresponding GOP, along the time axis (an arrow numbered "3").

Subsequently, the image processing unit 4 sets, as a processing target, a GOP adjacent to the GOP including the frame image which is being reproduced and positioned before the GOP including the frame image which is being reproduced on the time axis, and sequentially decodes a plurality of frame images constituting the corresponding GOP, along the time axis (an arrow numbered "4"). Subsequently, the image processing unit 4 sets, as a processing target, a GOP adjacent to the previously decoded GOP and positioned before the previously decoded GOP on the time axis, and sequentially decodes a plurality of frame images constituting the corresponding GOP, along the time axis (an arrow numbered "5").

Meanwhile, in a case of performing fast-slow reproduction of a video in the backward direction (see FIG. 12B), first, similarly in the case of performing fast-slow reproduction of a video in the forward direction, the image processing unit 4 sequentially decodes some frame images, constituting a GOP including a frame image which is being reproduced, of a plurality of frame images constituting the reproduction object video, along the time axis from an I-picture (an arrow numbered "1"). Subsequently, the image processing unit 4 sets, as a processing target, a GOP adjacent to the GOP including the frame image which is being reproduced, that is, the previously decoded GOP, and positioned before the previously decoded GOP on the time axis, and sequentially decodes a plurality of frame images constituting the corresponding GOP, along the time axis (an arrow numbered "2"). Subsequently, the image processing unit 4 sets, as a processing target, a GOP adjacent to the previously decoded GOP and positioned before the previously decoded GOP on the time axis, and sequentially decodes a plurality of frame images constituting the corresponding GOP, along the time axis (an arrow numbered "3").

Subsequently, the image processing unit 4 sets, as a processing target, a GOP adjacent to the GOP including the frame image which is being reproduced and positioned after the GOP including the frame image which is being reproduced on the time axis, and sequentially decodes a plurality of frame images constituting the corresponding GOP, along the time axis (an arrow numbered "4"). Subsequently, the image processing unit 4 sets, as a processing target, a GOP adjacent to the previously decoded GOP and positioned after the previously decoded GOP on the time axis, and sequentially decodes a plurality of frame images constituting the corresponding GOP, along the time axis (an arrow numbered "5").

Also, the contents of the GOPs constituting the videos and shown in FIGS. 12A and 12B are examples, and do not limit the present invention. For example, the number of P-pictures can be appropriately and arbitrarily changed, and GOPs may be configured to include B-pictures.

<Decoding Process>

Now, the decoding process which is performed by the image processing unit 4 will be described with reference to FIGS. 13 to 16.

Figure 13:
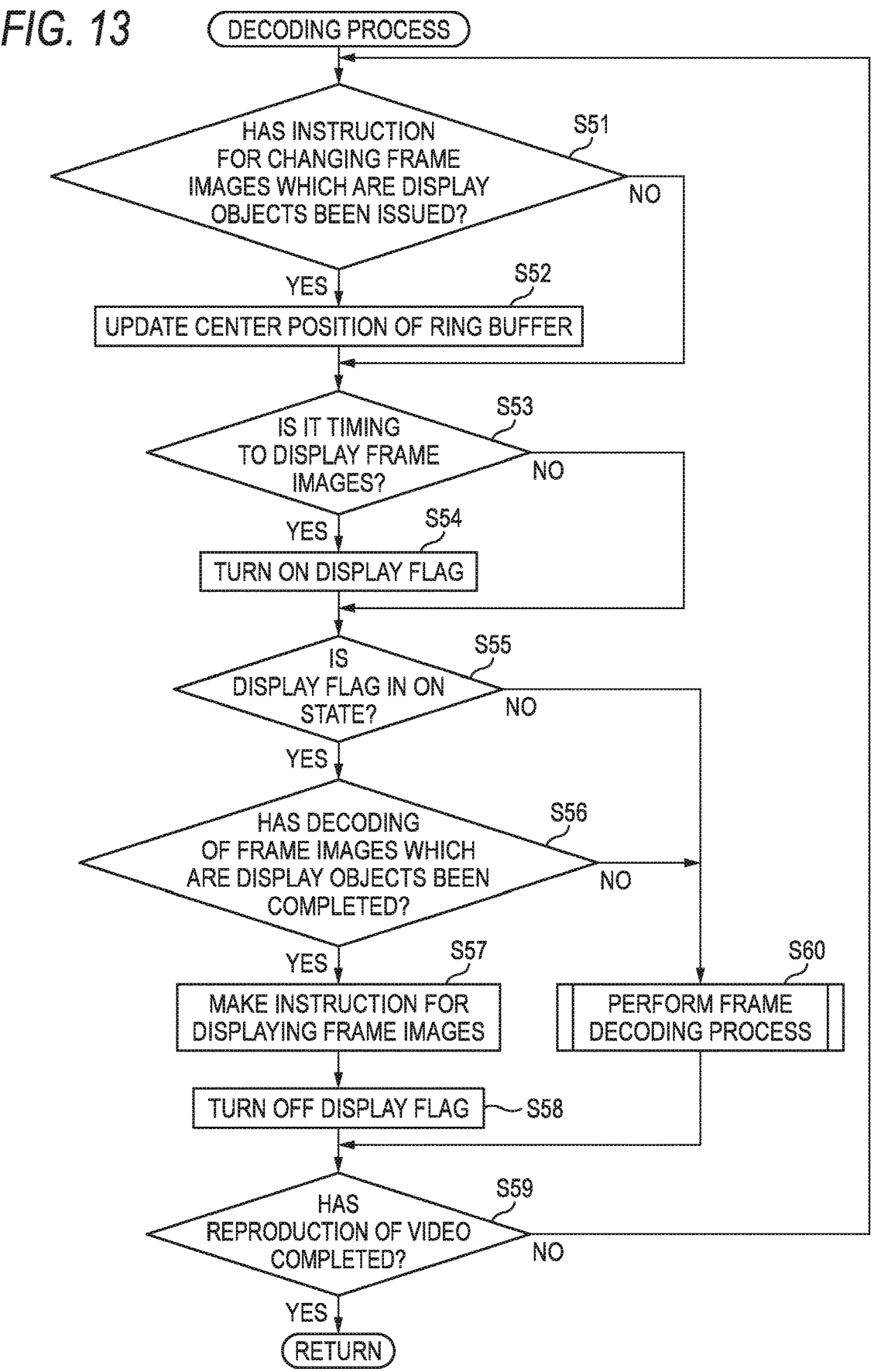
FIG. 13 is a flow chart illustrating examples of operations related to the decoding process of FIGS. 12A and 12B.

FIG. 13 is a flow chart illustrating examples of operations related to the decoding process which is performed by the image processing unit 4.

When the imaging apparatus 100 (200, 300, or 300A) performs a process of reproducing a reproduction object video composed of a plurality of frame images, the decoding process to be described below is performed at least before display object frame images are displayed.

Hereinafter, the decoding process which is performed by the imaging apparatus 100 of the first embodiment will be described as a representative.

As shown in FIG. 13, first, in STEP S51, the image processing unit 4 determines whether an instruction for changing display object frame images of the plurality of frame images constituting the video has been issued by the first reproduction control unit 7c of the operation processing unit 7.

If it is determined in STEP S51 that an instruction for changing display object frame images has been issued ("YES" in STEP S51), in STEP S52, the image processing unit 4 outputs an instruction for updating the center position of the storage area of the ring buffer, to the memory 2, and the memory 2 performs updating such that a plurality of decoded frame images constituting a GOP including the display object frame images is stored at the center position of the storage area of the ring buffer.

Meanwhile, in a case where it is determined that an instruction for changing display object frame images has not been issued ("NO" in STEP S51), the image processing unit 4 and the memory 2 skip the process of STEP S52.

Subsequently, in STEP S53, the first reproduction control unit 7c of the operation processing unit 7 determines whether it is the display timing to display the display object frame images on the display unit 5. This determining process is performed at predetermined intervals according to the reproduction frame rate of the display unit 5.

If it is determined in STEP S53 that it is the display timing to display the display object frame images on the display unit 5 ("YES" in STEP S53), in STEP S54, the first reproduction control unit 7c turns on a display flag.

Meanwhile, if it is determined that it is not the display timing to display the display object frame images on the display unit 5 ("NO" in STEP S53), the first reproduction control unit 7c skips the process of STEP S54.

Subsequently, in STEP S55, the image processing unit 4 determines whether the display flag is in the ON state.

If it is determined in STEP S55 that the display flag is in the ON state ("YES" in STEP S55), in STEP S56, the image processing unit 4 determines whether the display object frame images have been decoded.

If it is determined in STEP S56 that the display object frame images have been decoded ("YES" in STEP S56), in STEP S57, the image processing unit 4 outputs an instruction for displaying the display object frame images, to the operation processing unit 7. Then, in STEP S58, the first reproduction control unit 7c displays the frame images on the display unit 5, and turns off the display flag.

Thereafter, in STEP S59, the first reproduction control unit 7c determines whether reproduction of the video on the display unit 5 has been completed.

Meanwhile, if it is determined in STEP S55 that the display flag is not in the ON state ("NO" in STEP S55), in STEP S60, the image processing unit 4 performs a frame decoding process of decoding the frame images to be described below (see FIG. 14).

Even in a case where it is determined in STEP S56 that the display object frame images have not been decoded ("NO" in STEP S56), the decoding process proceeds to STEP S60. In STEP S60, the image processing unit 4 performs the frame decoding process.

After the frame decoding process of STEP S60, the decoding process proceeds to STEP S59. In STEP S59, the first reproduction control unit 7c determines whether reproduction of the video has been completed.

If it is determined in STEP S59 that reproduction of the video has not completed ("NO" in STEP S59), the decoding process returns to STEP S51, and the process of STEP S51 and the subsequent processes are performed. Meanwhile, if it is determined that reproduction of the video has been completed ("YES" in STEP S59), the decoding process is completed.

<Frame Decoding Process>

Hereinafter, the frame decoding process of the decoding process will be described in detail with reference to FIG. 14.

Figure 14:
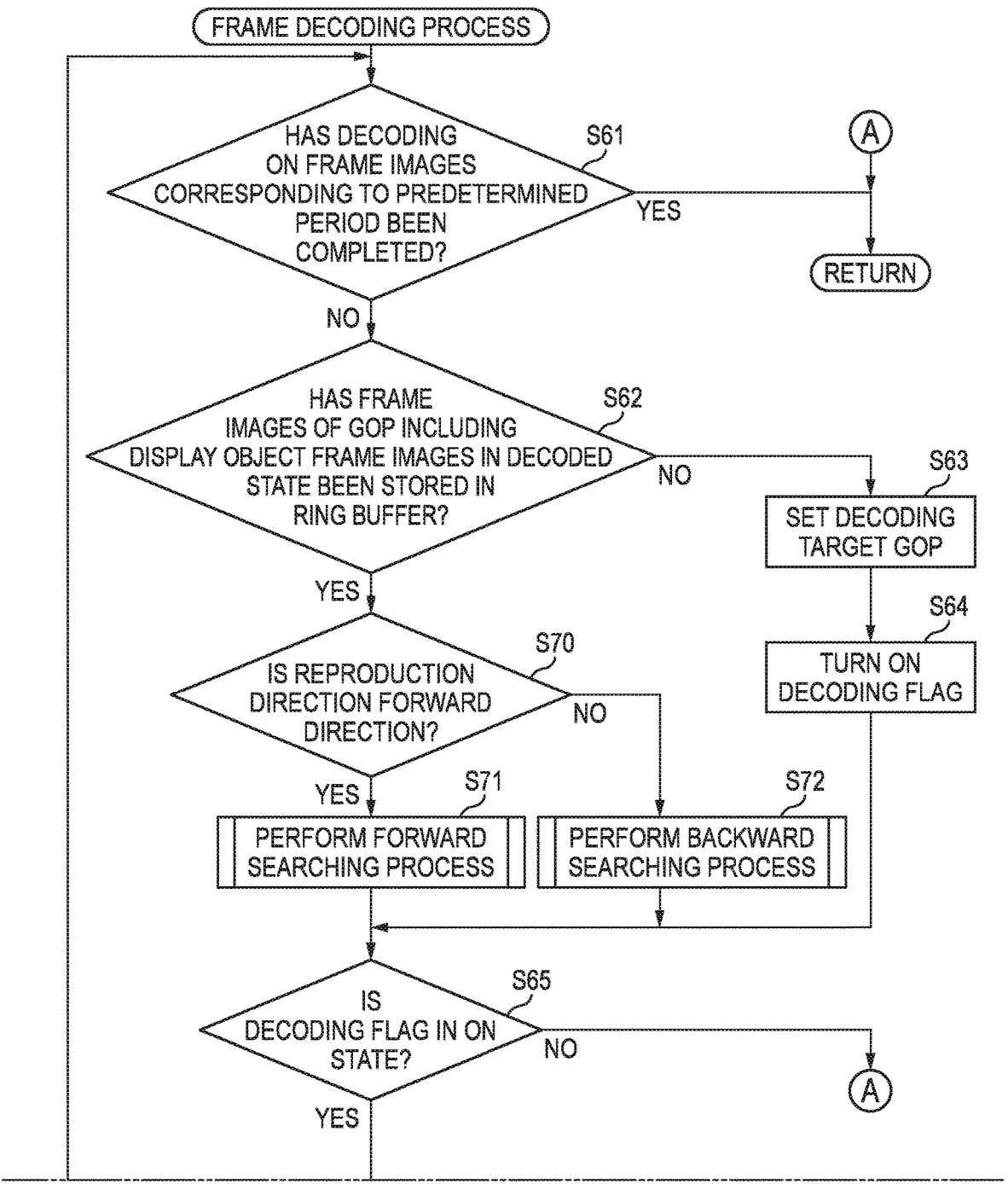
FIG. 14 is a flow chart illustrating examples of operations related to a flame decoding process of the decoding process of FIG. 13.

FIG. 14 is a flow chart illustrating examples of operations related to the frame decoding process.

As shown in FIG. 14, first, in STEP S61, the image processing unit 4 determines whether the frame images corresponding to the predetermined period corresponding to the capacity of the storage area of the ring buffer of the memory 2 have been decoded.

If it is determined in STEP S61 that the frame images corresponding to the predetermined period have not been decoded ("NO" in STEP S61), in STEP S62, the image processing unit 4 determines whether a plurality of frame images constituting the GOP including the display object frame images in the decoded state has been stored in the storage area of the ring buffer of the memory 2.

If it is determined in STEP S62, that the plurality of frame images has not been stored in the decoded state in the storage area of the ring buffer of the memory 2 ("NO" in STEP S62), the image processing unit 4 sets the GOP including the display object frame images, as a decoding target, in STEP S63, and turns on a decoding flag in STEP S64.

Thereafter, in STEP S65, the image processing unit 4 determines whether the decoding flag is in the ON state.

If it is determined in STEP S65 that the decoding flag is in the ON state ("YES" in STEP S65), in STEP S66, the image processing unit 4 determines whether any frame images decoded at the previous time are included in the GOP set as decoding targets.

If it is determined in STEP S66 that any frame images decoded at the previous time are not included in the GOP set as a decoding target ("NO" in STEP S66), since it is determined that any of the plurality of frame images constituting the decoding target GOP has not been decoded, in STEP S67, the image processing unit 4 designates the I-picture of the corresponding GOP, and decodes the frame images corresponding to the designated I-picture. Thereafter, in STEP S68, the image processing unit 4 outputs the decoded frame images to the memory 2, whereby the decoded frame images are stored in the storage area of the ring buffer, and turns off the decoding flag. Thereafter, the frame decoding process returns to STEP S61.

Meanwhile, it is determined in STEP S66 that the frame images decoded at the previous time are included in the GOP set as a decoding target ("YES" in STEP S66), in STEP S69, the image processing unit 4 designates the next frame images (for example, P-pictures) included in the plurality of frame images constituting the decoding target GOP, and decodes the corresponding frame images. Thereafter, the frame decoding process proceeds to STEP S68. In STEP S68, the image processing unit 4 outputs the decoded frame images to the memory 2, whereby the decoded frame images are stored in the storage area of the ring buffer, and turns off the decoding flag. Thereafter, the frame decoding process returns to STEP S61.

Meanwhile, if it is determined in STEP S62 that the plurality of frame images has been stored in the decoded state in the storage area of the ring buffer of the memory 2 ("YES" in STEP S62), in STEP S70, the image processing unit 4 determines whether the video reproduction direction of the first reproduction control unit 7c is the forward direction.

If it is determined in STEP S70 that the video reproduction direction is the forward direction ("YES" in STEP S70), in STEP S71, the image processing unit 4 performs a forward searching process (to be described below with reference to FIG. 15) of searching for a GOP to be the next decoding target in the forward direction.

Meanwhile, if it is determined in STEP S70 that the video reproduction direction is not the forward direction ("NO" in STEP S70), in STEP S72, the image processing unit 4 performs a backward searching process (to be described below with reference to FIG. 16) of searching for a GOP to be the next decoding target in the backward direction.

<Forward Searching Process>

Hereinafter, the forward searching process of the frame decoding process will be described in detail with reference to FIG. 15.

Figure 15:
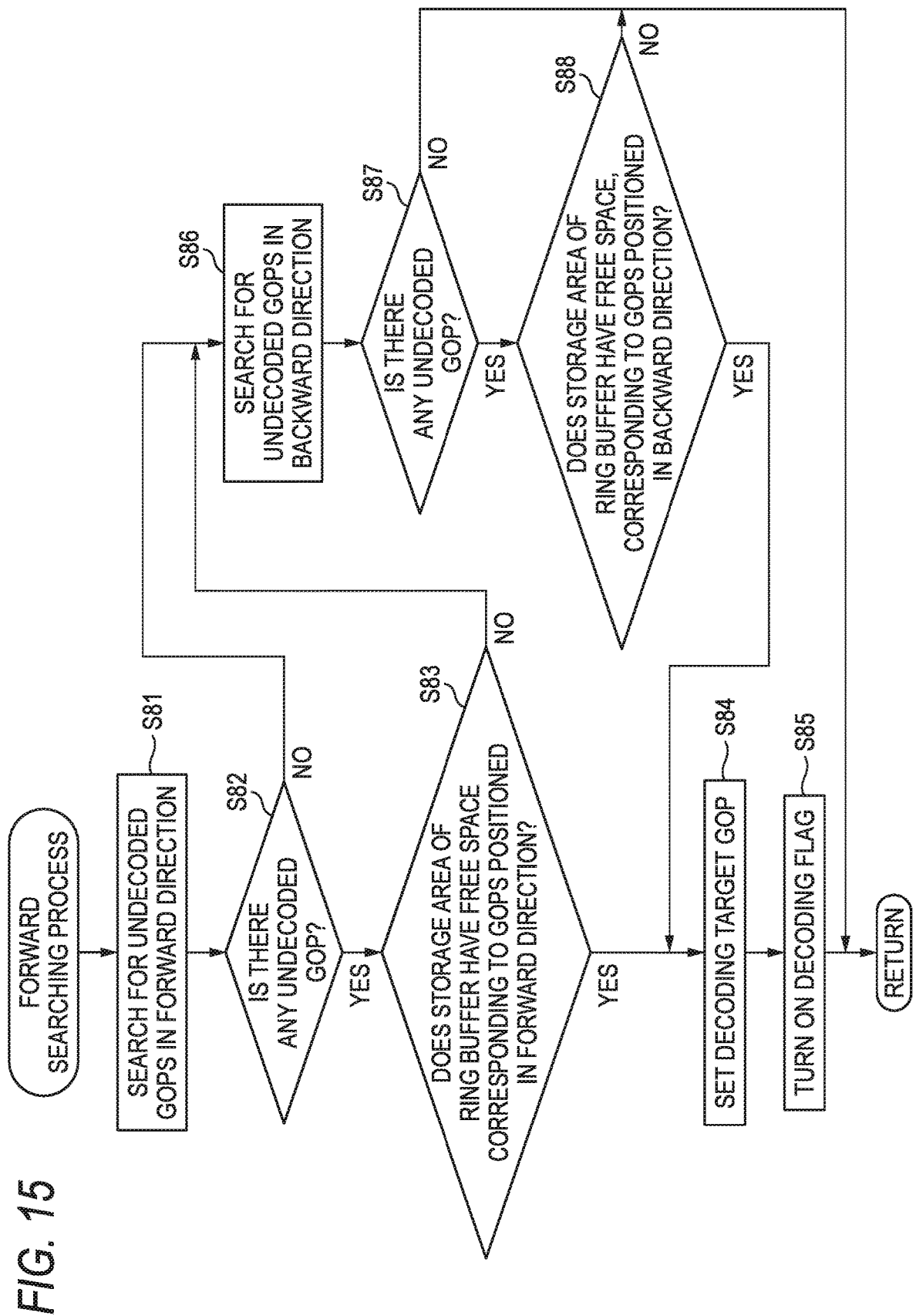
FIG. 15 is a flow chart illustrating examples of operations related to a forward searching process of the frame decoding process of FIG. 14.

FIG. 15 is a flow chart illustrating examples of operations related to the forward searching process.

As shown in FIG. 15, first, the image processing unit 4 searches the reproduction object video for undecoded GOPs in the forward direction (the positive direction on the time axis) which is the reproduction direction of the corresponding video, in STEP S81, and determines whether there is any undecoded GOP, in STEP S82.

If it is determined in STEP S82 that there is a undecoded GOP ("YES" in STEP S82), in STEP S83, the image processing unit 4 determines whether the storage area of the ring buffer of the memory 2 has an available area which corresponds to GOPs positioned in the forward direction and is for storing a plurality of decoded frame images constituting the searched GOP.

For example, if the center position of the storage area of the ring buffer where a plurality of decoded frame images constituting a GOP including display object frame images is stored is updated, an available area is formed in the storage area of the ring buffer of the memory 2.

If it is determined in STEP S83 that the storage area of the ring buffer has an available area corresponding to GOPs positioned in the forward direction ("YES" in STEP S83), the image processing unit sets the searched undecoded GOP as a decoding target in STEP S84, and turns on the decoding flag in STEP S85.

Thereafter, the image processing unit 4 completes the forward searching process.

Meanwhile, if it is determined in STEP S82 that there is no undecoded GOP ("NO" in STEP S82), in STEP S86, the image processing unit 4 searches the reproduction object video for undecoded GOPs in the backward direction (the negative direction on the time axis) which is the opposite direction to the reproduction direction of the corresponding video. Even in a case where it is determined in STEP S83 that the storage area of the ring buffer has no available area corresponding to GOPs positioned in the forward direction ("NO" in STEP S83), the image processing unit 4 advances the forward searching process to STEP S86 in which the image processing unit searches the reproduction object video for undecoded GOPs in the backward direction.

Subsequently, in STEP S87, the image processing unit 4 determines whether there is any undecoded GOP in the backward direction.

If it is determined in STEP S87 that there is a undecoded GOP ("YES" in STEP S87), in STEP S88, the image processing unit 4 determines whether the storage area of the ring buffer of the memory 2 has an available area corresponding to GOPs positioned in the backward direction.

If it is determined in STEP S88 that the storage area of the ring buffer has an available area corresponding to GOPs positioned in the backward direction ("YES" in STEP S88), the image processing unit 4 advances the forward searching process proceeds to STEP S84. In STEP S84, the image processing unit sets the searched undecoded GOP as a decoding target. Thereafter, the image processing unit 4 turns on the decoding flag in STEP S85, and completes the forward searching process.

Meanwhile, if it is determined in STEP S87 that there is no undecoded GOP ("NO" in STEP S87), the image processing unit 4 completes the forward searching process. Even in a case where it is determined in STEP S88 that the storage area of the ring buffer has no available area corresponding to GOPs positioned in the backward direction ("NO" in STEP S88), the image processing unit 4 completes the forward searching process.

<Backward Searching Process>

Hereinafter, the backward searching process of the frame decoding process will be described in detail with reference to FIG. 15.

Figure 16:
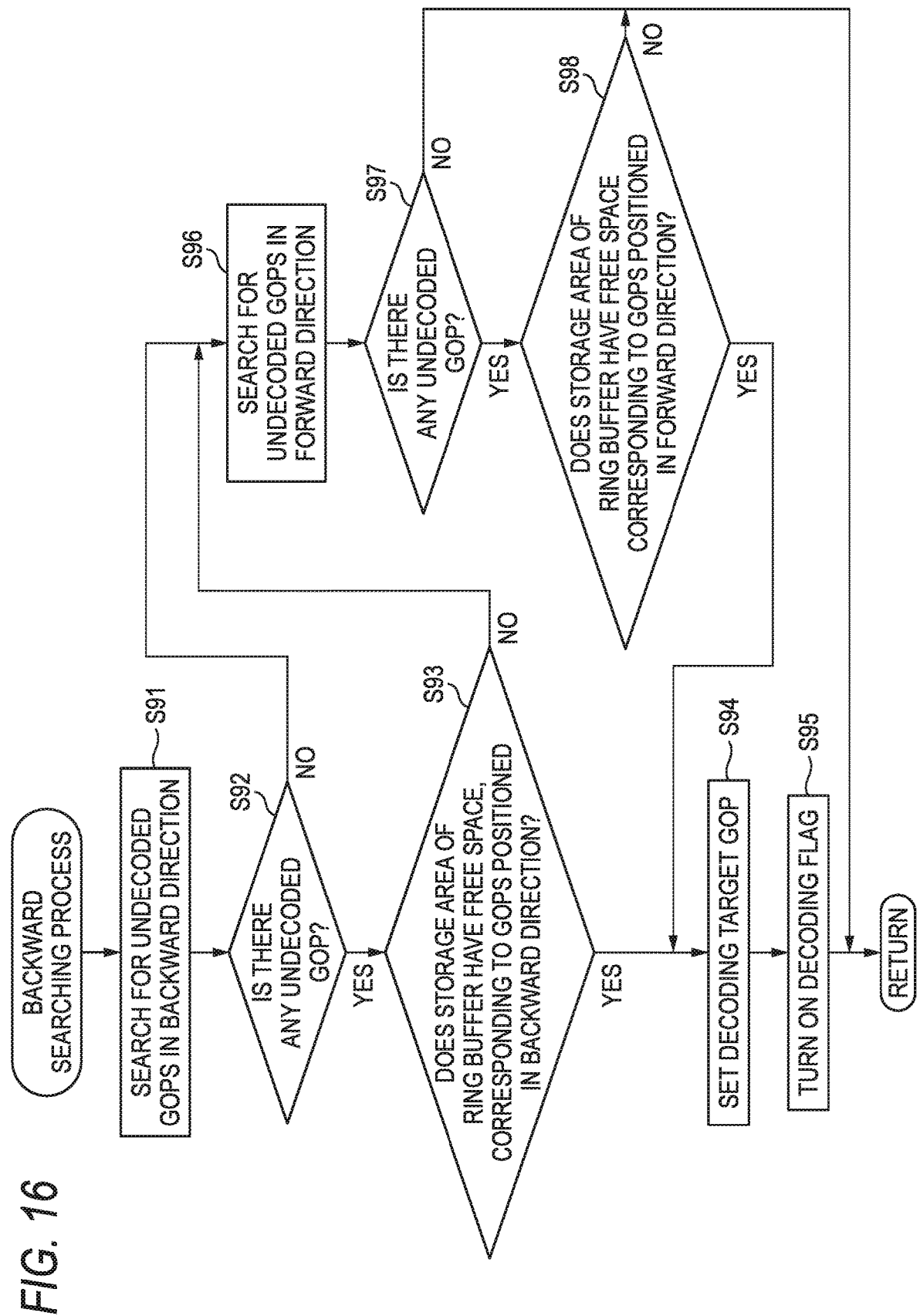
FIG. 16 is a flow chart illustrating examples of operations related to a backward searching process of the frame decoding process of FIG. 14.

FIG. 16 is a flow chart illustrating examples of operations related to the backward searching process.

As shown in FIG. 16, first, the image processing unit 4 searches the reproduction object video for undecoded GOPs in the backward direction (the negative direction on the time axis) which is the reproduction direction of the corresponding video, in STEP S91, and determines whether there is any undecoded GOP, in STEP S92.

If it is determined in STEP S92 that there is a undecoded GOP ("YES" in STEP S92), in STEP S93, the image processing unit 4 determines whether the storage area of the ring buffer of the memory 2 has an available area which corresponds to GOPs positioned in the backward direction and is for storing a plurality of decoded frame images constituting the searched GOP.

If it is determined in STEP S93 that the storage area of the ring buffer has an available area corresponding to GOPs positioned in the backward direction ("YES" in STEP S93), the image processing unit sets the searched undecoded GOP as a decoding target in STEP S94, and turns on the decoding flag in STEP S95.

Thereafter, the image processing unit 4 completes the backward searching process.

Meanwhile, if it is determined in STEP S82 that there is no undecoded GOP ("NO" in STEP S92), in STEP S96, the image processing unit 4 searches the reproduction object video for undecoded GOPs in the forward direction (the positive direction on the time axis) which is the opposite direction to the reproduction direction of the corresponding video. Even in a case where it is determined in STEP S93 that the storage area of the ring buffer has no available area corresponding to GOPs positioned in the backward direction ("NO" in STEP S93), the image processing unit 4 advances the backward searching process proceeds to STEP S96 in which the image processing unit searches the reproduction object video for undecoded GOPs in the forward direction.

Subsequently, in STEP S97, the image processing unit 4 determines whether there is any undecoded GOP in the forward direction.

If it is determined in STEP S97 that there is a undecoded GOP ("YES" in STEP S97), in STEP S98, the image processing unit 4 determines whether the storage area of the ring buffer of the memory 2 has an available area corresponding to GOPs positioned in the forward direction.

If it is determined in STEP S98 that the storage area of the ring buffer has an available area corresponding to GOPs positioned in the forward direction ("YES" in STEP S98), the image processing unit 4 advances the backward searching process proceeds to STEP S94. In STEP S94, the image processing unit sets the searched undecoded GOP as a decoding target. Thereafter, the image processing unit 4 turns on the decoding flag in STEP S95, and completes the forward searching process.

Meanwhile, if it is determined in STEP S97 that there is no undecoded GOP ("NO" in STEP S97), the image processing unit 4 completes the backward searching process. Even in a case where it is determined in STEP S98 that the storage area of the ring buffer has no available area corresponding to GOPs positioned in the forward direction ("NO" in STEP S98), the image processing unit 4 completes the backward searching process.

Referring to FIG. 14 again, in STEP S65, the image processing unit 4 determines whether the decoding flag is in the ON state.

If it is determined in STEP S65 that the decoding flag is in the ON state ("YES" in STEP S65), the image processing unit 4 decodes the frame images of the GOP searched in the forward searching process or the backward searching process and designated as a decoding target by the processes of STEPS S66 to S69, and turns off the decoding flag in STEP S68, and returns the frame decoding process to STEP S61.

The processes of steps described above are repeatedly performed until it is determined in STEP S61 that frame images corresponding to the predetermined period corresponding to the capacity of the storage area of the ring buffer of the memory 2 have been decoded ("YES" in STEP S61).

If it is determined in STEP S61 that the frame images corresponding to the predetermined period have been decoded ("YES" in STEP S61), the image processing unit 4 completes the frame decoding process.

Even in a case where it is determined in STEP S65 that the decoding flag is not in the ON state ("NO" in STEP S65), the image processing unit 4 completes the frame decoding process.

Therefore, some frame images, corresponding to the predetermined period, of a plurality of frame images constituting a reproduction object video are decoded in advance, and the decoded frame images corresponding to the predetermined period are stored, whereby it becomes possible to immediately display a frame image designated from the first reproduction control unit 7c, on the display panel 5a. Therefore, it is possible to display the video at a user's desired reproduction speed.

Especially, with reference to the position of a frame image which is being reproduced, the image processing unit performs a process of decoding frame images, corresponding to the predetermined period, positioned in each of the current reproduction direction and the opposite direction to the current reproduction direction. Therefore, it is possible to perform decoding not only on frame images positioned in the current reproduction direction but also on frame images positioned in the opposite direction, and for example, even if the user switches the reproduction direction of the video to the opposite direction, it is possible to immediately display a frame image designated from the first reproduction control unit 7c, on the display panel 5a.

Also, the image processing unit specifies the decoding process order of frame images corresponding to the predetermined period and positioned in the current reproduction direction and frame images corresponding to the predetermined period and positioned in the opposite direction to the current reproduction direction, according to the current reproduction direction of the video, and then performs the corresponding decoding process. Therefore, it is possible to appropriately decode a plurality of frame images constituting a video, in view of the current reproduction direction of the corresponding video. In other words, for example, if frame images positioned in the current reproduction direction of a video are decoded in preference to frame images positioned in the opposite direction, in a case where the user searches for desired images while performing fast-slow reproduction of the video, it is possible to cope with a case where fast-slow reproduction of frame images positioned in the reproduction direction of the fast-slow reproduction is performed for a relatively long period, and it becomes possible to immediately display a frame image designated from the first reproduction control unit 7c, on the display panel 5a.

Also, in the decoding process described above, the image processing unit 4 may specify the decoding process order of frame images corresponding to the predetermined period and positioned in the current reproduction direction and frame images corresponding to the predetermined period and positioned in the opposite direction to the current reproduction direction, according to the current reproduction speed of a video which is reproduced by the first reproduction control unit 7c of the operation processing unit 7, and perform the decoding process in advance.

For example, in a case where the current reproduction speed of a video is a predetermined speed (for example, a normal reproduction speed), with respect to a GOP including a frame image which is being reproduced, the image processing unit 4 specifies a predetermined number of GOPs (for example, two GOPs) positioned in each of the reproduction direction of the video and the opposite direction to the reproduction direction, as decoding targets. Further, the image processing unit 4 specifies the decoding process order such that GOPs positioned in the current reproduction direction is decoded in preference to GOPs positioned in the opposite direction as the reproduction speed of the video increases.

Now, with respect to frame images corresponding to the predetermined period, the order in which those frame images are decoded by the image processing unit 4 in a case where the capacity of the storage area of the ring buffer of the memory 2 is fixed will be described.

On the assumption that the capacity of the storage area of the ring buffer of the memory 2 corresponds to five GOPs which are units constituting a video, the following description will be made.

Figure 17A:
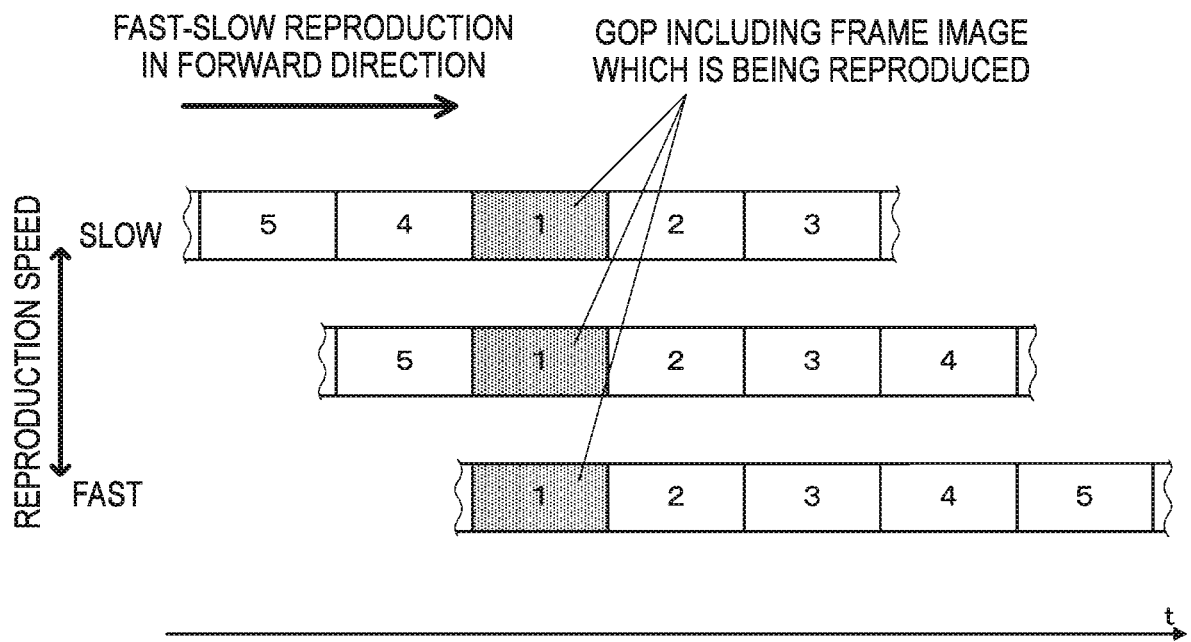
FIGS. 17A and 17B are views for explaining a decoding process which the image processing unit performs in a case where the capacity of the storage area of a ring buffer of a memory is fixed.
Figure 17B:
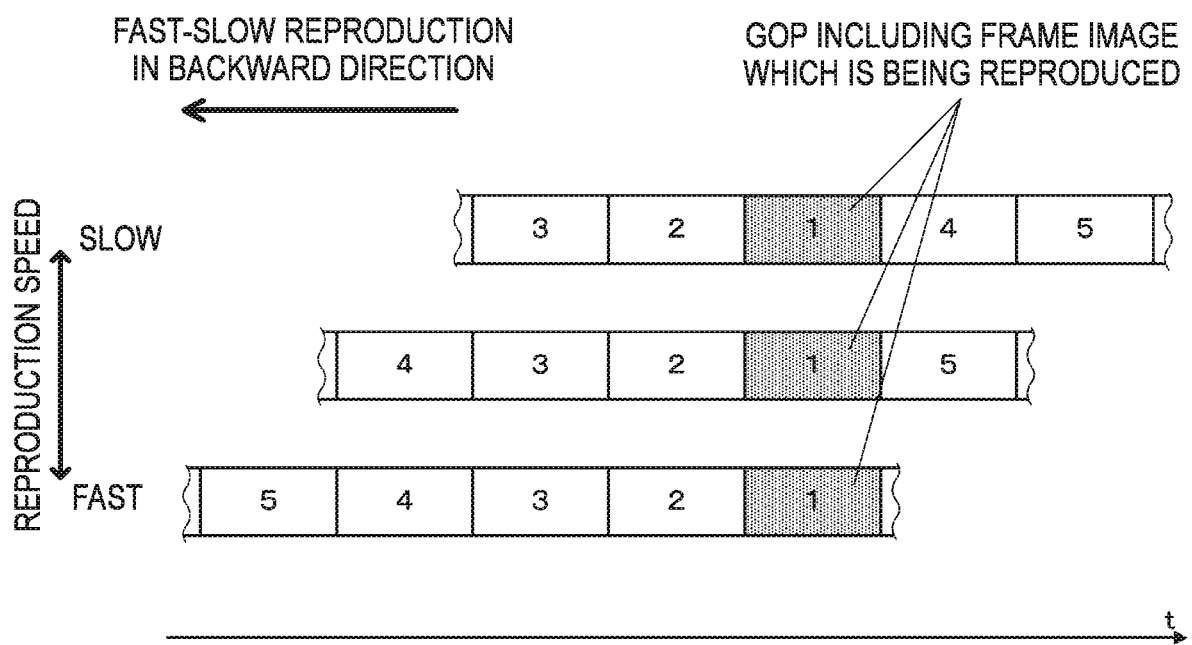

FIGS. 17A and 17B are views for explaining a decoding process which is performed by the image processing unit 4 in a case where the capacity of the storage area of the ring buffer of the memory 2 is fixed. FIG. 17A corresponds to a case of performing fast-slow reproduction in the forward direction, and FIG. 17B corresponds to a case of performing fast-slow reproduction in the backward direction.

In FIGS. 17A and 17B, each column schematically represents a GOP constituting a video, and a GOP marked with dots represents a GOP including a frame image which is being reproduced. Also, numbers in each column represent the decoding process order.

For example, in a case of perform fast-slow reproduction in the forward direction (see FIG. 17A), if the current reproduction direction of the video is a predetermined speed (for example, the normal reproduction speed), the image processing unit 4 performs the decoding process in the order of a GOP "1" including the frame image which is being reproduced (in FIG. 17A, the GOP marked with dots), a GOP "2" adjacent to the GOP "1" from the positive direction on the time axis, a GOP "3" adjacent to the GOP "2" from the positive direction on the time axis, a GOP "4" adjacent to the GOP "1", including the frame image which is being reproduced, from the negative direction on the time axis, and a GOP "5" adjacent to the GOP "4" from the negative direction on the time axis.

Meanwhile, for example, if the reproduction speed of the video increases from the predetermined speed, the image processing unit 4 performs the decoding process in the order of the GOP "1" including the frame image which is being reproduced, the GOP "2" adjacent to the GOP "1" from the positive direction on the time axis, the GOP "3" adjacent to the GOP "2" from the positive direction on the time axis, the GOP "4" adjacent to the GOP "3" from the positive direction on the time axis, and the GOP "5" adjacent to the GOP "1", including the frame image which is being reproduced, from the negative direction on the time axis.

Also, for example, if the reproduction speed of the video further increases, the image processing unit 4 performs the decoding process in the order of the GOP "1" including the frame image which is being reproduced, the GOP "2" adjacent to the GOP "1" from the positive direction on the time axis, the GOP "3" adjacent to the GOP "2" from the positive direction on the time axis, the GOP "4" adjacent to the GOP "3" from the positive direction on the time axis, and the GOP "5" adjacent to the GOP "1" from the positive direction on the time axis.

Meanwhile, in a case of perform fast-slow reproduction in the backward direction (see FIG. 17B), if the current reproduction direction of the video is a predetermined speed (for example, the normal reproduction speed), the image processing unit 4 performs the decoding process in the order of the GOP "1" including the frame image which is being reproduced, the GOP "2" adjacent to the GOP "1" from the negative direction on the time axis, the GOP "3" adjacent to the GOP "2" from the negative direction on the time axis, the GOP "4" adjacent to the GOP "1", including the frame image which is being reproduced, from the positive direction on the time axis, and the GOP "5" adjacent to the GOP "4" from the positive direction on the time axis.

Meanwhile, for example, if the reproduction speed of the video increases from the predetermined speed, the image processing unit 4 performs the decoding process in the order of the GOP "1" including the frame image which is being reproduced, the GOP "2" adjacent to the GOP "1" from the negative direction on the time axis, the GOP "3" adjacent to the GOP "2" from the negative direction on the time axis, the GOP "4" adjacent to the GOP "3" from the negative direction on the time axis, and the GOP "5" adjacent to the GOP "1", including the frame image which is being reproduced, from the positive direction on the time axis.

Also, for example, if the reproduction speed of the video further increases, the image processing unit 4 performs the decoding process in the order of the GOP "1" including the frame image which is being reproduced, the GOP "2" adjacent to the GOP "1" from the negative direction on the time axis, the GOP "3" adjacent to the GOP "2" from the negative direction on the time axis, the GOP "4" adjacent to the GOP "3" from the negative direction on the time axis, and the GOP "5" adjacent to the GOP "1" from the negative direction on the time axis.

Now, a case of increasing the capacity of the storage area of the ring buffer of the memory 2 according to the reproduction speed of the video in the above described situation will be described.

On the assumption that, in a case where the current reproduction direction of the video is a predetermined speed (for example, the normal reproduction speed), the capacity of the storage area of the ring buffer of the memory 2 corresponds to five GOPs which are units constituting the video, and as the reproduction speed of the video increases, the capacity increases in units of a GOP, the following description will be made.

Figure 18A:
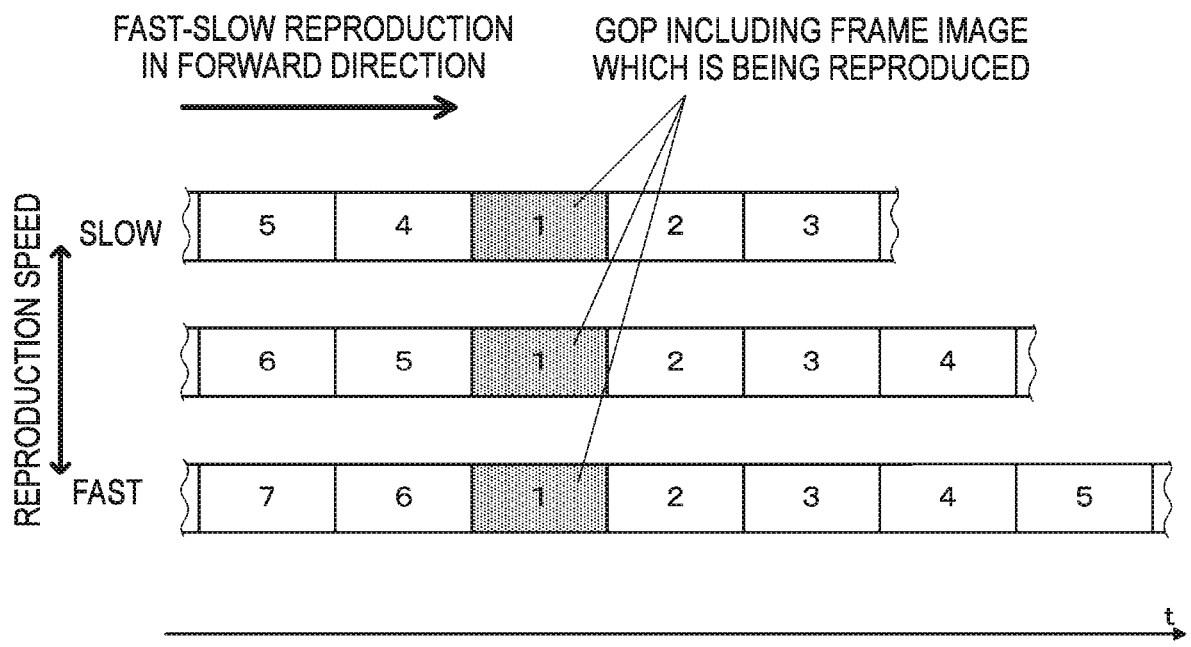
FIGS. 18A and 18B are views for explaining a decoding process which the image processing unit performs in a case where the capacity of the storage area of the ring buffer of the memory is variable.
Figure 18B:
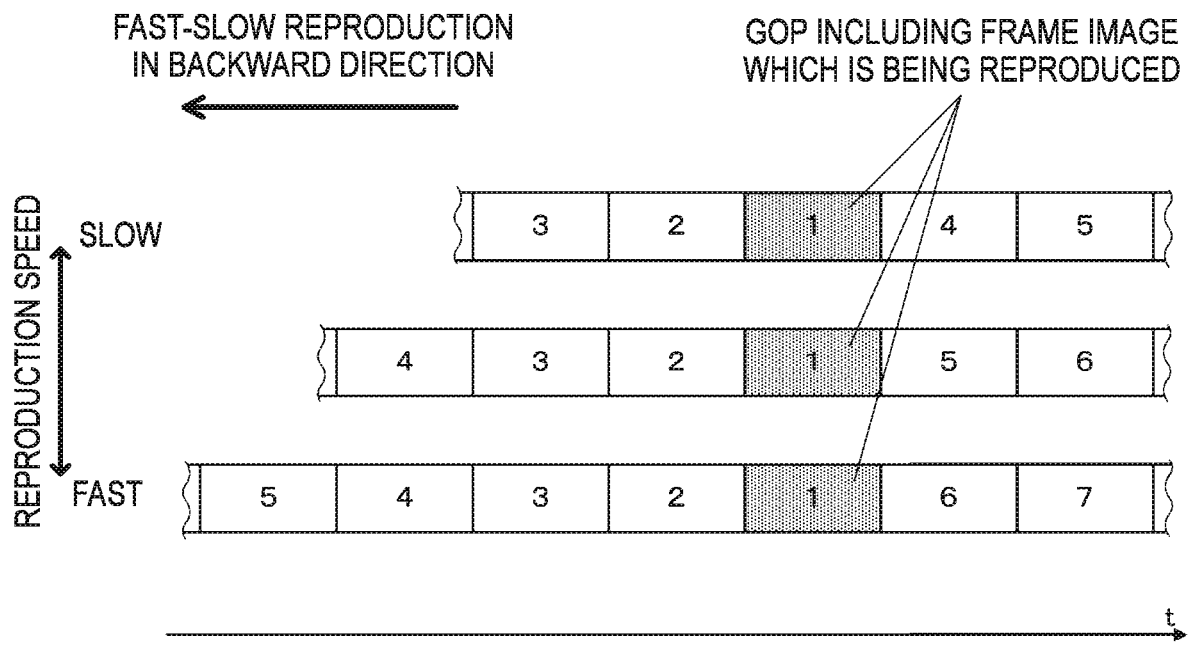

FIGS. 18A and 18B are views for explaining a decoding process which the image processing unit 4 performs in a case where the capacity of the storage area of the ring buffer of the memory 2 is variable. FIG. 18A corresponds to a case of performing fast-slow reproduction in the forward direction, and HG 18B corresponds to a case of performing fast-slow reproduction in the backward direction.

In FIGS. 18A and 18B, each column schematically represents a GOP constituting a video, and a GOP marked with dots represents a GOP including a frame image which is being reproduced. Also, numbers in each column represent the decoding process order.

For example, in a case of perform fast-slow reproduction in the forward direction (see HG 18A), if the current reproduction direction of the video is a predetermined speed (for example, the normal reproduction speed), similarly in the case where the capacity of the storage area of the ring buffer of the memory 2 is fixed, the image processing unit 4 performs the decoding process in the order of a GOP "1" including the frame image which is being reproduced (in FIG. 18A, the GOP marked with dots), a GOP "2" adjacent to the GOP "1" from the positive direction on the time axis, a GOP "3" adjacent to the GOP "2" from the positive direction on the time axis, a GOP "4" adjacent to the GOP "1", including the frame image which is being reproduced, from the negative direction on the time axis, and a GOP "5" adjacent to the GOP "4" from the negative direction on the time axis.

Meanwhile, for example, if the reproduction speed of the video increases from the predetermined speed, the capacity of the storage area of the ring buffer of the memory 2 increases by the unit of one GOP, and the image processing unit 4 performs the decoding process in the order of the GOP "1" including the frame image which is being reproduced, the GOP "2" adjacent to the GOP "1" from the positive direction on the time axis, the GOP "3" adjacent to the GOP "2" from the positive direction on the time axis, the GOP "4" adjacent to the GOP "3" from the positive direction on the time axis, the GOP "5" adjacent to the GOP "1", including the frame image which is being reproduced, from the negative direction on the time axis, and a GOP "6" adjacent to the GOP "5" from the negative direction on the time axis.

Also, for example, if the reproduction speed of the video further increases, the capacity of the storage area of the ring buffer of the memory 2 further increases by the unit of one GOP, and the image processing unit 4 performs the decoding process in the order of the GOP "1" including the frame image which is being reproduced, the GOP "2" adjacent to the GOP "1" from the positive direction on the time axis, the GOP "3" adjacent to the GOP "2" from the positive direction on the time axis, the GOP "4" adjacent to the GOP "3" from the positive direction on the time axis, the GOP "5" adjacent to the GOP "4" from the positive direction on the time axis, a GOP "6" adjacent to the GOP "1", including the frame image which is being reproduced, from the negative direction on the time axis, and a GOP "7" adjacent to the GOP "6" from the negative direction on the time axis.

Meanwhile, in a case of perform fast-slow reproduction in the backward direction (see FIG. 18B), if the current reproduction direction of the video is a predetermined speed (for example, the normal reproduction speed), similarly in the case where the capacity of the storage area of the ring buffer of the memory 2 is fixed, the image processing unit 4 performs the decoding process in the order of the GOP "1" including the frame image which is being reproduced, the GOP "2" adjacent to the GOP "1" from the negative direction on the time axis, the GOP "3" adjacent to the GOP "2" from the negative direction on the time axis, the GOP "4" adjacent to the GOP "1", including the frame image which is being reproduced, from the positive direction on the time axis, and the GOP "5" adjacent to the GOP "4" from the positive direction on the time axis.

Meanwhile, for example, if the reproduction speed of the video increases from the predetermined speed, the capacity of the storage area of the ring buffer of the memory 2 increases by the unit of one GOP, and the image processing unit 4 performs the decoding process in the order of the GOP "1" including the frame image which is being reproduced, the GOP "2" adjacent to the GOP "1" from the negative direction on the time axis, the GOP "3" adjacent to the GOP "2" from the negative direction on the time axis, the GOP "4" adjacent to the GOP "3" from the negative direction on the time axis, the GOP "5" adjacent to the GOP "1", including the frame image which is being reproduced, from the positive direction on the time axis, and the GOP "6" adjacent to the GOP "5" from the positive direction on the time axis.

Also, for example, if the reproduction speed of the video further increases, the capacity of the storage area of the ring buffer of the memory 2 further increases by the unit of one GOP, and the image processing unit 4 performs the decoding process in the order of the GOP "1" including the frame image which is being reproduced, the GOP "2" adjacent to the GOP "1" from the negative direction on the time axis, the GOP "3" adjacent to the GOP "2" from the negative direction on the time axis, the GOP "4" adjacent to the GOP "3" from the negative direction on the time axis, the GOP "5" adjacent to the GOP "5" from the negative direction on the time axis, the GOP "6" adjacent to the GOP "1", including the frame image which is being reproduced, from the positive direction on the time axis, and the GOP "7" adjacent to the GOP "6" from the positive direction on the time axis.

As described above, the image processing unit specifies the decoding process order of frame images corresponding to the predetermined period and positioned in the current reproduction direction and frame images corresponding to the predetermined period and positioned in the opposite direction to the current reproduction direction, according to the current reproduction speed of the video, and then performs the corresponding decoding process. Therefore, it is possible to appropriately decode a plurality of frame images constituting a video, in view of the current reproduction speed of the corresponding video. For example, if frame images positioned in the current reproduction direction of a video are decoded in preference to frame images positioned in the opposite direction as the current reproduction speed of the video increases, in a case where the user searches for desired images while performing fast-slow reproduction of the video, it is possible to cope with a case where fast-slow reproduction of frame images positioned in the reproduction direction of the fast-slow reproduction is performed at a relatively high speed, and it becomes possible to immediately display a frame image designated from the first reproduction control unit 7c, on the display panel 5a. Therefore, it is possible to display the video at a user's desired reproduction speed.

Also, in the above described situation, the image processing unit may specify frames positioned in each of the current reproduction direction of the video and the opposite direction to the current reproduction direction, or a time required to perform the GOP decoding process, according to the current reproduction speed, and perform the decoding process in advance.

Also, the decoding process orders of frame images, corresponding to the predetermined period, shown in FIGS. 17A, 17B, 18A, and 18B are examples and do not limit the present invention, and can be appropriately and arbitrarily changed. For example, in the case of increasing the capacity of the storage area of the ring buffer of the memory 2 according to the reproduction speed of a video, similarly in the case where the capacity of the storage area of the ring buffer of the memory 2 is fixed, the priorities of the GOP "1" including the frame image which is being reproduced and GOPs positioned in the opposite direction to the reproduction direction may be decreased.

Also, the correspondence relations between the directions of user's slide operations and video reproduction directions shown in the above described embodiments are examples, and do not limit the present invention, and can be application and arbitrarily changed.

Also, for example, in a case where user's slide operations are performed upward or downward, perforations may be provided on the left and right of frame images.

Also, in the first to third embodiment described above, while the user is performing a touch operation on the touch panel 6a (206a), the operation speed is sequentially measured, and reproduction of a video which is displayed on the display panel 5a is controlled based on the sequentially measured operation speed. However, this is merely an example, and the present invention is not limited thereto. For example, if the user starts a slide operation from a certain position on the touch panel 6a, the first measuring unit 7b may subsequently measure the amount of slide, and while the user's slide operation is performed, the first reproduction control unit 7c may continuously control the quantity of switching of an image displayed on the display panel 5a to another image, such that the quantity of switching varies depending on the amount of slide subsequently measured.

In this way, even in a case where reproduction objects are still images, while a slide operation is performed on the touch panel 6a, the amount of slide which is variable is sequentially measured, and is reflected in control on switching of a plurality of display images. Therefore, it is possible to consecutively perform switching of display images at a user's desired speed, whereby it is possible to easily display user's desired images.

Also, the amount of slide (the number of pixels) per unit time is subsequently measured, whereby the operation speed is subsequently measured. However, in a case of prioritize a fast forwarding operation, the unit time may be set so as to be so long that a slide operation is completed within one unit time, whereby the display speed can be controlled in proportion to the amount of slide. In this case, the process of measuring the speed of slide is reduced.

In other words, while the user performs a slide operation on the touch panel 6a, a first process of controlling the reproduction speed of a video which is displayed on the display panel 5a may be performed based on the amount of slide, and after the user's slide operation on the touch panel 6a is completed, a second process of controlling reproduction of the video which is being displayed while keeping the reproduction speed controlled in the first process may be performed.

Further, the configurations of the imaging apparatuses 100, 200, 300, and 300A shown in the first to third embodiments are examples, and do not limit the present invention. Also, although the imaging apparatuses 100, 200, 300, and 300A have been described as examples of a display apparatus, the present invention is not limited thereto. The display apparatus may be configured so as to or so as not to have an imaging function.

Further, in the first to third embodiments described above, the functions of the acquiring unit, the measuring unit, and the control unit are implemented by driving the frame rate acquiring unit 7a, the first measuring unit 7b (the second measuring unit 207b or the third measuring unit 307b), and the first reproduction control unit 7c (the second reproduction control unit 207c or the third reproduction control unit 307c) under control of the central control unit 1. However, the present invention is not limited thereto. These functions may be implemented by executing a predetermined program or the like by the CPU of the central control unit 1.

In other words, in a program memory (not shown), a program including an acquisition process routine, a measurement process routine, and a control process routine is recorded in advance. In this case, the acquisition process routine may cause the CPU of the central control unit 1 to implement a function of acquiring the imaging frame rate of a reproduction object video. Also, the measurement process routine may cause the CPU of the central control unit 1 to implement a function of subsequently measuring the operation speed of a user's touch operation on the touch panel 6a while the operation is performed. Also, the control process routine may cause the CPU of the central control unit 1 to implement a function of controlling reproduction of the video which is displayed on the display panel 5a based on an acquired imaging frame rate and the subsequently measured operation speed.

Further, as a computer-readable recording medium which retains the above described program for implementing the individual processes, besides a ROM and a hard disk drive, a non-volatile memory such as a flash memory, and a portable recording medium such as a CD-ROM can also be applied. Also, as a medium for providing data on the program through a desired communication line, a carrier wave may be applied.

Although some embodiments of the present invention have been described, the scope of the present invention is not limited to the above described embodiments, and includes the scopes of inventions disclosed in claims and the scopes of their equivalents.

What is claimed is:

1. A display apparatus comprising:
a touch panel;
a display; and
a processor that is configured to:
in response to detecting a touch operation input by a user on an arbitrary position on the touch panel while the display performs switching display in which images are switched, temporarily cause the display to stop performing the switching display;
in response to detecting a slide operation input by the user after the touch operation, switch an image displayed when the display stops performing the switching display to another image specified based on a slide amount of the slide operation starting from the position of the detected touch operation; and
in response to detecting an end of the slide operation and the touch operation, cause the display to restart performing the switching display with a switching amount of the restarted switching display being determined based on the slide amount of the slide operation.

2. A display apparatus comprising:
a touch panel;
a display; and
a processor that is configured to:
in response to detecting a touch operation input by a user on an arbitrary position on the touch panel while the display performs switching display in which images are switched, temporarily cause the display to stop performing the switching display;
in response to detecting a slide operation input by the user after the touch operation, switch an image displayed when the display stops performing the switching display to another image specified based on an acceleration of the slide operation starting from the position of the detected touch operation; and
in response to detecting an end of the slide operation and the touch operation, cause the display to restart performing the switching display with a switching amount of the restarted switching display being determined based on the acceleration of the slide operation.

3. A display apparatus comprising:
a touch panel;
a display; and
a processor that is configured to:
in response to detecting a touch operation input by a user on an arbitrary position on the touch panel while the display reproduces a video, temporarily cause the display to stop reproducing the video;
in response to detecting a slide operation input by the user after the touch operation, switch a frame image displayed when the display stops reproducing the video to another frame image specified based on a slide amount of the slide operation starting from the position of the detected touch operation; and
in response to detecting an end of the slide operation and the touch operation, cause the display to restart reproducing the video having been stopped with a reproduction speed of the video after the restart being determined based on the slide amount of the slide operation.

4. A display method of a display apparatus which includes a touch panel and a display, the method comprising:
in response to detecting a touch operation input by a user on an arbitrary position on the touch panel while the display performs switching display in which images are switched, temporarily causing the display to stop performing the switching display;
in response to detecting a slide operation input by the user after the touch operation, switching an image displayed when the display stops performing the switching display to another image specified based on a slide amount of the slide operation starting from the position of the detected touch operation; and
in response to detecting an end of the slide operation and the touch operation, causing the display to restart performing the switching display with a switching amount of the restarted switching display being determined based on the slide amount of the slide operation.

5. A display method of a display apparatus which includes a touch panel and a display, the method comprising:
in response to detecting a touch operation input by a user on an arbitrary position on the touch panel while the display performs switching display in which images are switched, temporarily causing the display to stop performing the switching display;
in response to detecting a slide operation input by the user after the touch operation, switching an image displayed when the display stops performing the switching display to another image specified based on an acceleration of the slide operation starting from the position of the detected touch operation; and
in response to detecting an end of the slide operation and the touch operation, causing the display to restart performing the switching display with a switching amount of the restarted switching display being determined based on the acceleration of the slide operation.

6. A display method of a display apparatus which includes a touch panel and a display, the method comprising:
in response to detecting a touch operation input by a user on an arbitrary position on the touch panel while the display reproduces a video, temporarily causing the display to stop reproducing the video;
in response to detecting a slide operation input by the user after the touch operation, switching a frame image displayed when the display stops reproducing the video to another frame image specified based on a slide amount of the slide operation starting from the position of the detected touch operation; and in response to detecting an end of the slide operation and the touch operation, causing the display to restart reproducing the video having been stopped with a reproduction speed of the video after the restart being determined based on the slide amount of the slide operation.

7. A non-transitory computer readable storage medium storing a program for controlling a display apparatus including a touch panel and a display to cause the display apparatus to perform operations comprising:

in response to detecting a touch operation input by a user on an arbitrary position on the touch panel while the display performs switching display in which images are switched, temporarily causing the display to stop performing the switching display;

in response to detecting a slide operation input by the user after the touch operation, switching an image displayed when the display stops performing the switching display to another image specified based on a slide amount of the slide operation starting from the position of the detected touch operation; and in response to detecting an end of the slide operation and the touch operation, causing the display to restart performing the switching display with a switching amount of the restarted switching display being determined based on the slide amount of the slide operation.

8. A non-transitory computer readable storage medium storing a program for controlling a display apparatus including a touch panel and a display to cause the display apparatus to perform operations comprising:

in response to detecting a touch operation input by a user on an arbitrary position on the touch panel while the display performs switching display in which images are switched, temporarily causing the display to stop performing the switching display;

in response to detecting a slide operation input by the user after the touch operation, switching an image displayed when the display stops performing the switching display to another image specified based on an acceleration of the slide operation starting from the position of the detected touch operation; and in response to detecting an end of the slide operation and the touch operation, causing the display to restart performing the switching display with a switching amount of the restarted switching display being determined based on the acceleration of the slide operation.

9. A non-transitory computer readable storage medium storing a program for controlling a display apparatus including a touch panel and a display to cause the display apparatus to perform operations comprising:

in response to detecting a touch operation input by a user on an arbitrary position on the touch panel while the display reproduces a video, temporarily causing the display to stop reproducing the video;

in response to detecting a slide operation input by the user after the touch operation, switching a frame image displayed when the display stops reproducing the video to another frame image specified based on a slide amount of the slide operation starting from the position of the detected touch operation; and in response to detecting an end of the slide operation and the touch operation, causing the display to restart reproducing the video having been stopped with a reproduction speed of the video after the restart being determined based on the slide amount of the slide operation.

* * * * *

UNITED STATES PATENT AND TRADEMARK OFFICE
CERTIFICATE OF CORRECTION

PATENT NO. : 10,732,830 B2
APPLICATION NO. : 16/185317
DATED : August 4, 2020
INVENTOR(S) : Hiroyuki Kato, Hideaki Matsuda and Jun Muraki It is certified that error appears in the above-identified patent and that said Letters Patent is hereby corrected as shown below:

On the Title Page

Above item (51), insert:
--Foreign Application Priority Data
May 22, 2015 (JP) ............. 2015-104390
Aug. 07, 2015 (JP) ............. 2015-156913--.

Signed and Sealed this
Eighth Day of December, 2020

Andrei Iancu
*Director of the United States Patent and Trademark Office*